United States Patent
Kawai et al.

(10) Patent No.: US 10,530,947 B2
(45) Date of Patent: Jan. 7, 2020

(54) IMAGE READING DEVICE AND IMAGE FORMING APPARATUS

(71) Applicants: Takuji Kawai, Kanagawa (JP); Yoshiaki Nagao, Kanagawa (JP); Yohei Osanai, Kanagawa (JP)

(72) Inventors: Takuji Kawai, Kanagawa (JP); Yoshiaki Nagao, Kanagawa (JP); Yohei Osanai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/270,682

(22) Filed: Feb. 8, 2019

(65) Prior Publication Data

US 2019/0260892 A1    Aug. 22, 2019

(30) Foreign Application Priority Data

Feb. 21, 2018  (JP) ................. 2018-028779

(51) Int. Cl.
*H04N 1/00* (2006.01)
*G03G 15/22* (2006.01)
*H04N 1/10* (2006.01)

(52) U.S. Cl.
CPC ....... *H04N 1/00519* (2013.01); *G03G 15/221* (2013.01); *H04N 1/00554* (2013.01); *H04N 1/1013* (2013.01)

(58) Field of Classification Search
CPC .............. B65H 1/04; B65H 2402/45; B65H 2405/111646; B65H 2405/324;
(Continued)

(56) References Cited

U.S. PATENT DOCUMENTS

| 5,862,446 A * | 1/1999 | Hashizume .......... H04N 1/0464 399/367 |
| 7,869,103 B2 * | 1/2011 | Ikeda ....................... H04N 1/03 358/449 |

(Continued)

FOREIGN PATENT DOCUMENTS

| JP | 5-204055 | 8/1993 |
| JP | 2001-228561 | 8/2001 |

(Continued)

*Primary Examiner* — Negussie Worku
(74) *Attorney, Agent, or Firm* — Harness, Dickey & Pierce, P.L.C.

(57) ABSTRACT

An image reading device includes an image reader movable along an image reading face, a casing to house the image reader, including a restraint holder, and a restraint to be held by the restraint holder of the casing and configured to restrict movement of the image reader. The restraint includes an operation portion to be disposed outside the casing. The operation portion is operated to move the restraint, in the restraint holder, to: a restricting position to restrict movement of the image reader; a first unlock position to cancel restriction of movement of the image reader; and a second unlock position at which movement of the image reader is not restricted. At the first unlock position, movement of the restraint to the restricting position is allowed. From the second unlock position, movement to the restricting position is less smooth than movement from the first unlock position to the restricting position.

19 Claims, 19 Drawing Sheets

(58) Field of Classification Search
CPC ........ B65H 2405/3321; B65H 2801/39; B65H 31/02; B65H 31/20; G03G 21/1633; G03G 21/1647; G03G 21/1666; G03G 2215/00202; G03G 2221/1636; G03G 15/60; H04N 1/00525; H04N 1/0053; H04N 1/00535; H04N 1/1017; H04N 1/193; H04N 1/03; H04N 1/0464; H04N 1/1043; H04N 1/1048; H04N 1/1052; H04N 1/121; H04N 1/1215; H04N 2201/02402; H04N 2201/02404; H04N 2201/02452; H04N 2201/02477; H04N 2201/02485; H04N 2201/02495; H04N 2201/0404; H04N 2201/0422; H04N 2201/0442; H04N 2201/0446; H04N 2201/0456
USPC ............... 358/474, 449, 471, 496, 497, 498; 271/207; 399/110, 200, 367, 379, 95
See application file for complete search history.

(56) References Cited

U.S. PATENT DOCUMENTS

| | | | |
|---|---|---|---|
| 7,907,312 B2* | 3/2011 | Miyahara | H04N 1/1017 248/407 |
| 2010/0328736 A1* | 12/2010 | Ozawa | H04N 1/1017 358/494 |
| 2012/0147439 A1* | 6/2012 | Taki | H04N 1/00925 358/448 |
| 2014/0063571 A1* | 3/2014 | Sayama | H04N 1/1017 358/497 |
| 2016/0083214 A1* | 3/2016 | Murodate | H04N 1/0053 271/207 |
| 2017/0142271 A1* | 5/2017 | Kawai | H04N 1/00623 |
| 2017/0331971 A1* | 11/2017 | Kurotsu | G03G 15/04045 |

FOREIGN PATENT DOCUMENTS

| | | |
|---|---|---|
| JP | 2007-110466 | 4/2007 |
| JP | 2011-070113 | 4/2011 |

\* cited by examiner

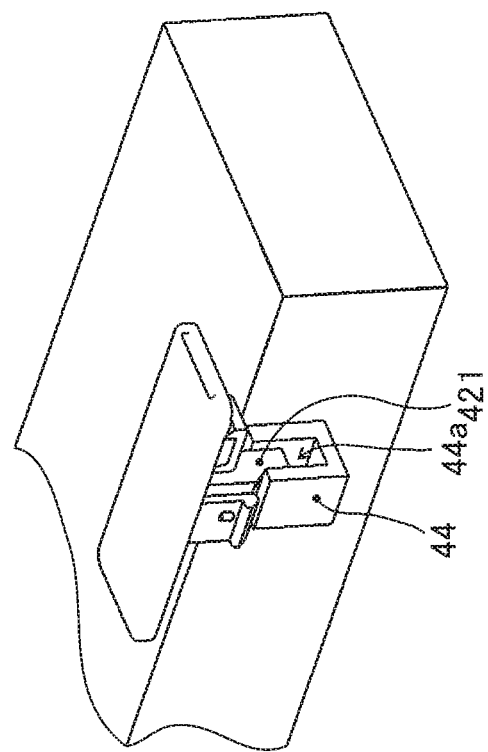
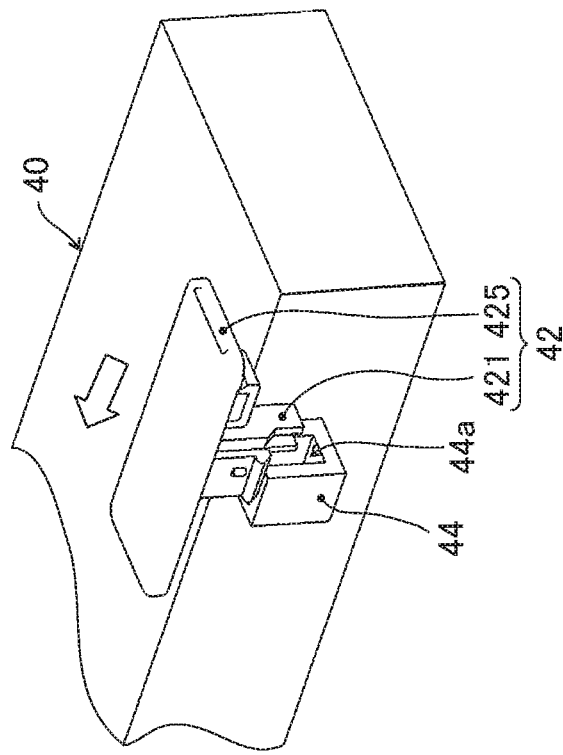

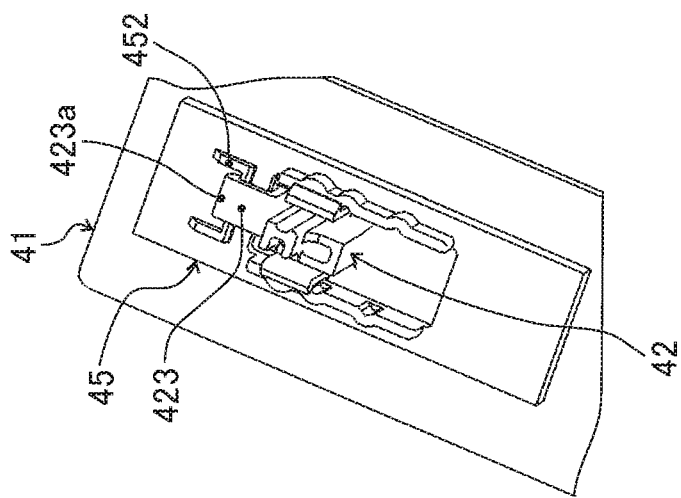
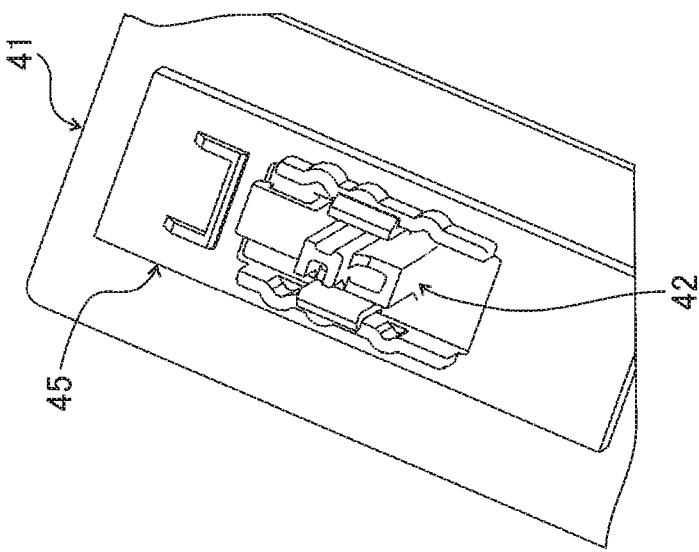
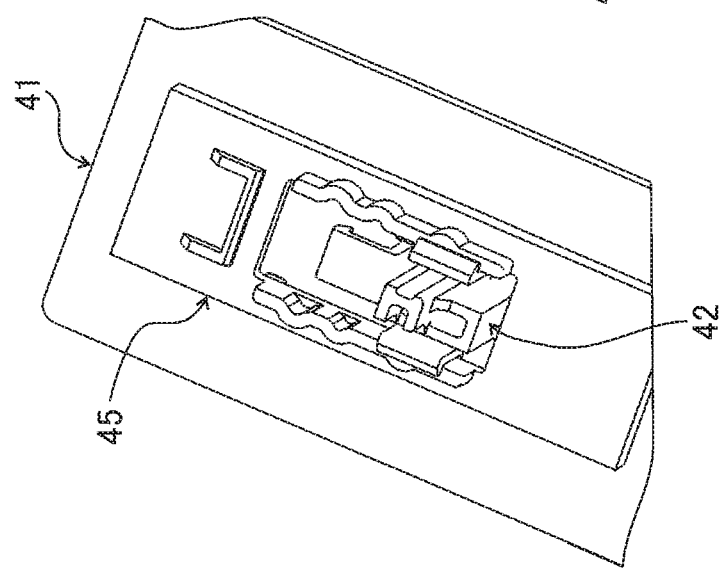

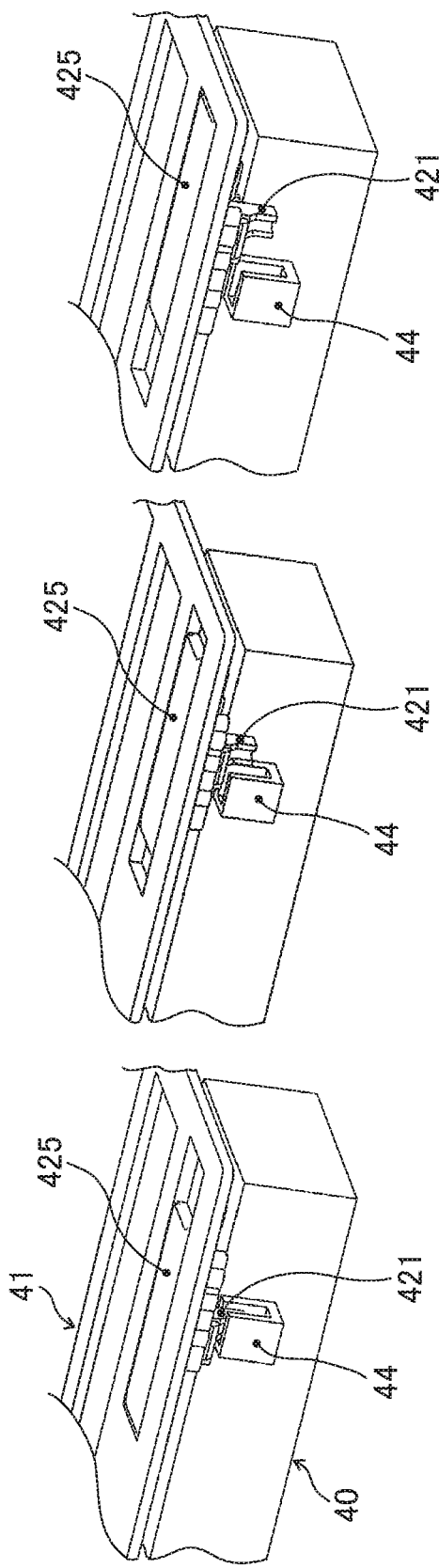

IMAGE READING DEVICE AND IMAGE FORMING APPARATUS

CROSS-REFERENCE TO RELATED APPLICATION

This patent application is based on and claims priority pursuant to 35 U.S.C. § 119(a) to Japanese Patent Application No. 2018-028779, filed on Feb. 21, 2018, in the Japan Patent Office, the entire disclosure of which is hereby incorporated by reference herein.

BACKGROUND

Technical Field

The present disclosure relates to an image reading device and an image forming apparatus.

Description of the Related Art

Conventionally, an image reading device including an image reader movable along an image reading face, a restraint for restricting the movement of the image reader, and a casing in which the image reader is housed is known.

SUMMARY

According to an embodiment of this disclosure, an image reading device includes an image reader movable along an image reading face, a casing configured to house the image reader and including a restraint holder, and a restraint to be held by the restraint holder of the casing and configured to restrict movement of the image reader. The restraint includes an operation portion to be disposed outside the casing. The operation portion is operated to move the restraint, in the restraint holder, to: a restricting position to restrict movement of the image reader; a first unlock position to cancel restriction of movement of the image reader; and a second unlock position at which movement of the image reader is not restricted. At the first unlock position, movement of the restraint to the restricting position is allowed. From the second unlock position, movement of the restraint to the restricting position is less smooth than movement from the first unlock position to the restricting position.

According to another embodiment, an image reading device includes the above-described image reader, the above-described casing, and a document pressing portion openably and closably supported by the casing. The document pressing portion presses a document placed on the image reading face against the image reading face when the document pressing portion is closed relative to the image reading face. The image reading device further includes a restraint to be held by the restraint holder of the casing and configured to restrict movement of the image reader. The restraint includes an operation portion to be disposed outside the casing. The operation portion is operated to move the restraint, in the restraint holder, to: a restricting position to restrict movement of the image reader; and an unlock position to cancel restriction of movement of the image reader. The image reading device further includes a fitter configured to cause the document pressing portion to fit with the operation portion when the document pressing portion is closed while the restraint is at one of the restricting position and the unlock position. The fitter is configured to cause the document pressing portion to interfere with the operation portion when the document pressing portion is closed while the restraint is between the restricting position and the unlock position.

According to another embodiment, an image forming apparatus includes one of the above-described image reading device.

BRIEF DESCRIPTION OF THE DRAWINGS

The aforementioned and other aspects, features, and advantages of the present disclosure would be better understood by reference to the following detailed description when considered in connection with the accompanying drawings, wherein:

FIG. 10A is a perspective view illustrating an unlocked state before securing the optical scanning unit with the lock member;

FIG. 10B is a perspective view illustrating a locked state in which the optical scanning unit is secured with the lock member;

FIG. 11A is a perspective view when the lock member is in a lock position;

FIG. 11B is a perspective view when the lock member is located at an unlock position;

FIG. 11C is a perspective view when the lock member is located at an unlock securing position;

FIG. 12A is a perspective view when the lock member is at the lock position;

FIG. 12B is a perspective view when the lock member is located at the unlock position;

FIG. 12C is a perspective view when the lock member is located at the unlock securing position;

Figure 1:
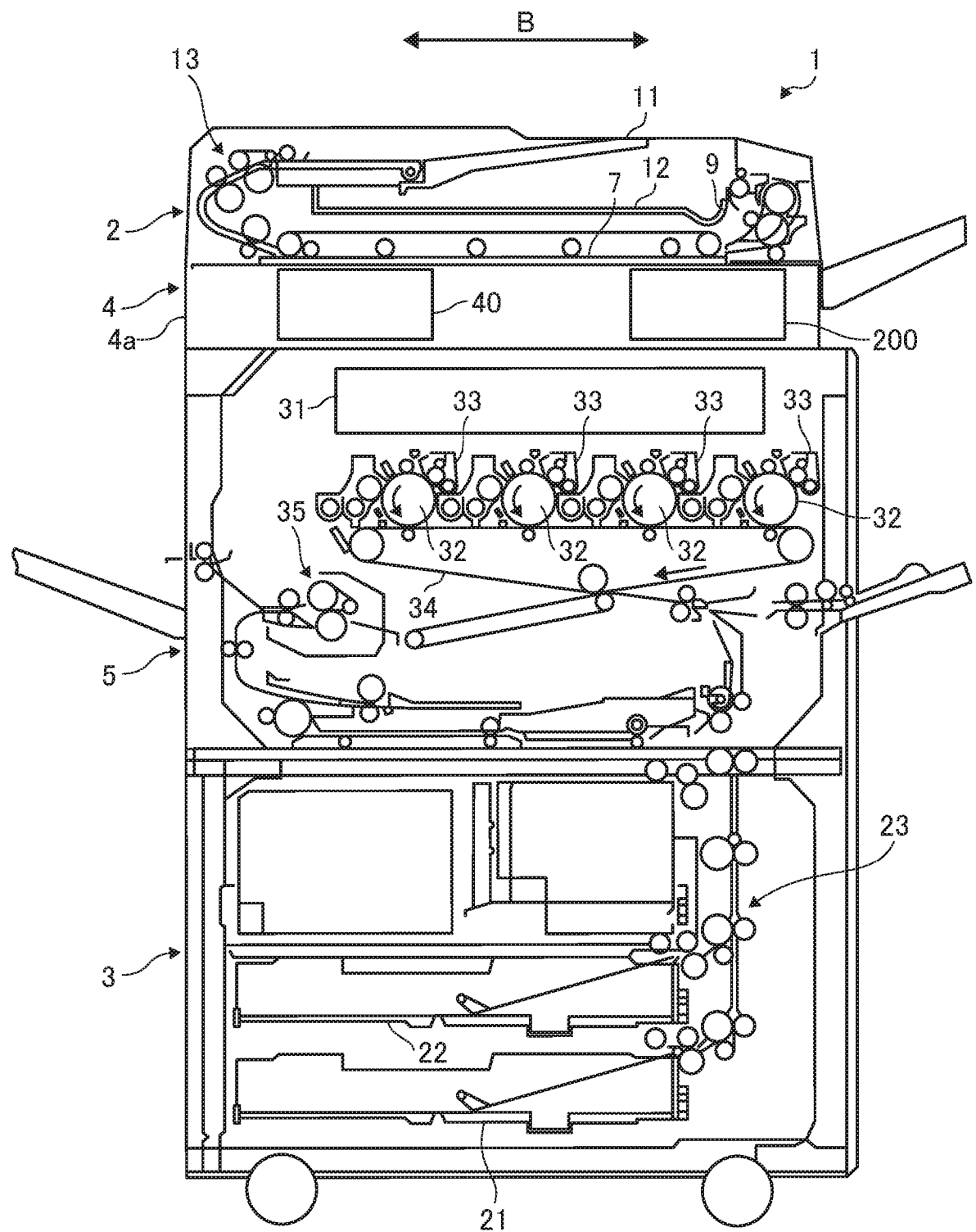
FIG. 1 is a schematic view illustrating an example of a color copier as an image forming apparatus according to an embodiment of the present invention.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

As used herein, the singular forms "a", "an", and "the" are intended to include the plural forms as well, unless the context clearly indicates otherwise.

Figure 2:
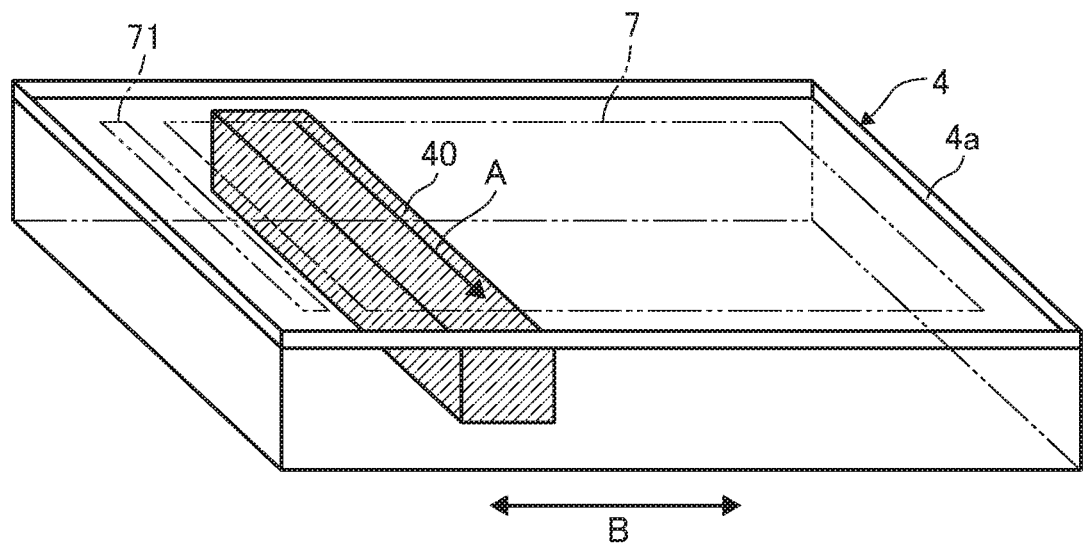
FIG. 2 is a schematic perspective view illustrating a configuration example of a scanner of the color copier.

FIG. 1 is a schematic view illustrating an example of a color copier 1 as an image forming apparatus according to an embodiment of the present invention. FIG. 2 is a schematic perspective view illustrating a configuration example of a scanner 4 (a reading device) of the color copier 1 in FIG. 1.

In FIG. 1, the color copier 1 of the present embodiment includes an automatic document feeder (hereinafter also referred to as "ADF") 2, a sheet feeder 3, the scanner 4 as an image reading device, and an image forming unit 5.

The ADF 2 mentioned above includes a first document tray 11 and a document conveyer 13 including various rollers and the like, which separates documents one by one from a document bundle placed on the first document tray 11 and conveys the documents toward a document-feeder (DF) exposure glass 71. The ADF 2 includes a sheet ejection section 9 including various rollers and the like and, when a document on the DF exposure glass 71 is read by an optical scanning unit 40 of the scanner 4, the document is ejected to a sheet ejection tray 12 by the sheet ejection section 9.

The ADF 2 also includes a document conveyer including various rollers and the like, which separates documents one by one from a document bundle placed on a second document tray and conveys the documents toward the DF exposure glass 71. A conveying path of the document conveyer is joined to a conveying path from the above-described first document tray 11 through a branching portion and the conveying path is obliquely straight to a sheet outlet. The DF exposure glass 71 is inclined with respect to an exposure glass 7 described later in a height direction. The various rollers and the like forming the document conveyer that conveys the document placed on the second document tray are partially shared with the document conveyer 13 that conveys the document placed on the first document tray 11. Furthermore, the ADF 2 is attached to the scanner 4 so as to be freely opened and closed via an opening and closing mechanism such as a hinge. The ADF 2 also has a function as a document pressing portion that presses the document against the exposure glass 7 to secure when the optical scanning unit 40 moves in the scan advancing direction (a direction indicated by arrow B) and reads the document placed on the exposure glass 7.

The above-described sheet feeder 3 includes sheet feed trays 21 and 22 that accommodate recording sheets as recording media having different sheet sizes and a sheet feeding mechanism 23 including various rollers, which conveys the recording sheets accommodated in the sheet feed trays 21 and 22 to an image formation position of the image forming unit 5.

As illustrated in FIG. 2, the above-described scanner 4 includes the built-in optical scanning unit (hereinafter referred to as "optical scanning unit") 40 as an image reader in a casing 4a. The optical scanning unit 40 holds a light source and a contact image sensor in which a main-scanning direction matches with a longitudinal direction (a direction indicated by arrow A), or holds a light source, a lens, a charge coupled device (CCD), and a mirror. The optical scanning unit 40 is caused to scan (move) in a sub-scanning direction (a direction indicated by arrow B), which is the scan advancing direction, by a driver included in the scanner 4, such that a two-dimensional color image on the document placed on the exposure glass 7 is read. The exposure glass 7 is provided on an upper part of the casing 4a of the scanner 4 and serves an upper face of the casing 4a. The above-mentioned driver includes a wire secured to the optical scanning unit 40, a plurality of driven pulleys and a drive pulley, over which the wire is bridged, a motor that rotates the drive pulley, and the like, and a publicly known configuration can be used.

The above-mentioned image forming unit 5 is an image forming unit that includes an exposure device 31, a plurality of photoconductor drums 32, developing devices 33 installed around the respective photoconductor drums 32 and having toners of different colors, a transfer belt 34, and a fixing device 35. The colors of toners accommodated in the respective developing devices 33 are cyan (C), yellow (Y), magenta (M), black (Bk), and the like. The image forming unit 5 forms toner images of respective colors on the plurality of photoconductor drums 32 according to image data read and color-decomposed by the optical scanning unit 40 of the scanner 4. The image forming unit 5 primarily transfers the toner images from the photoconductor drums 32 and superimposes the toner imagers on the transfer belt 34. Then, the toner images on the transfer belt 34 are secondarily transferred onto a recording sheet supplied from the sheet feeder 3. Thereafter, the toners of a toner image transferred onto the recording sheet are fused by the fixing device 35, whereby a color image is fixed on the recording sheet.

Furthermore, the color copier 1 may includes an image transmission and reception device to transmit the image that has been read to another device.

Next, a description will be given of a lock mechanism that restricts the movement of the optical scanning unit 40 accommodated in the scanner 4 such that the optical scanning unit 40 does not inadvertently move in the direction indicated by arrow B when the color copier 1 is transported.

Figure 3:
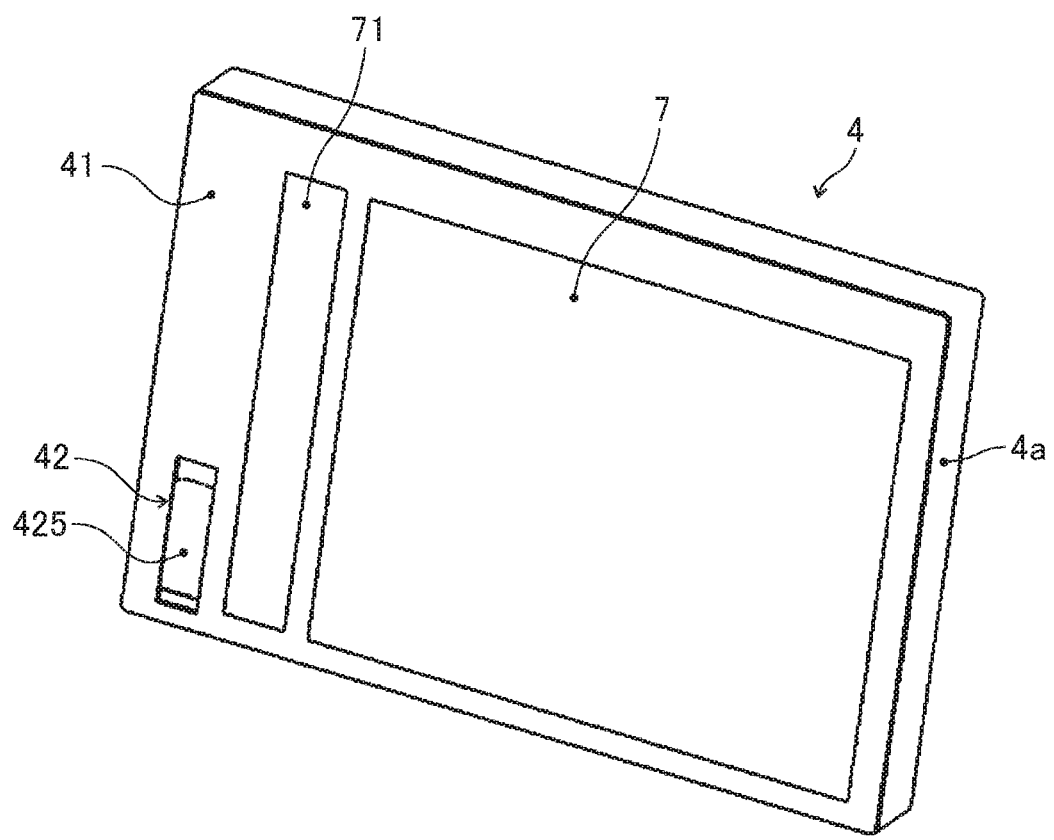
FIG. 3 is a perspective view illustrating an appearance of the scanner of the color copier as viewed from a document table side.
Figure 4A:
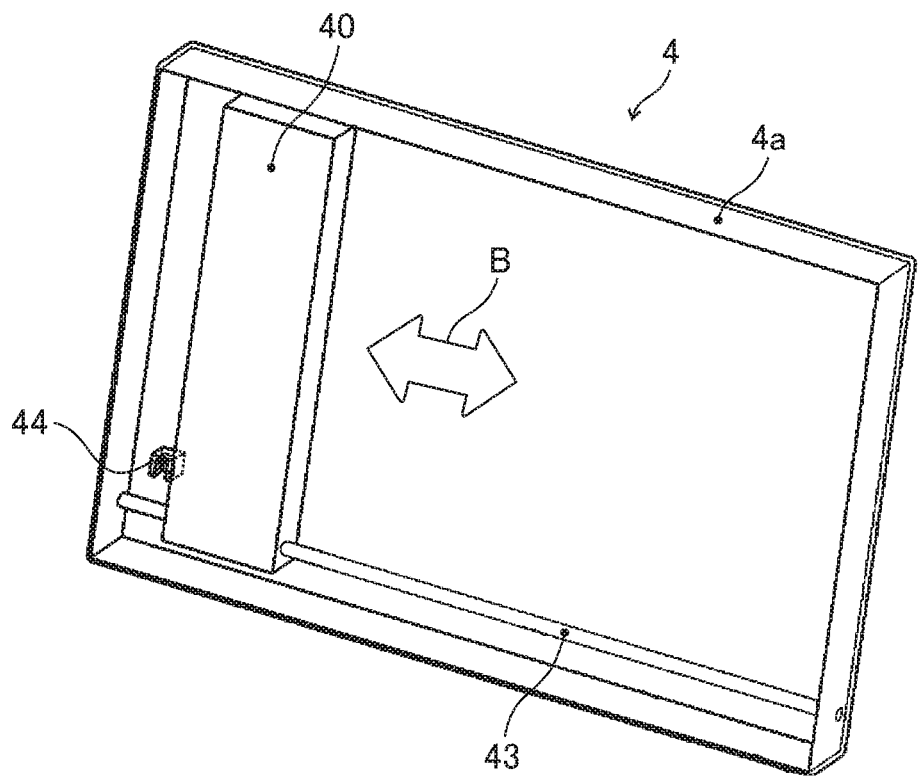
FIG. 4A is a schematic perspective view of the scanner when the document table is removed.
Figure 4B:
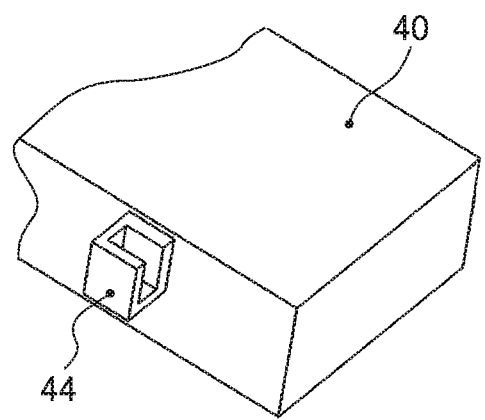
FIG. 4B is an enlarged perspective view illustrating a portion of a lock receiving member provided in an optical scanning unit housed in the scanner.

FIG. 3 is a perspective view illustrating the appearance of the scanner 4 of the color copier 1 as viewed from the side of a document table 41. FIG. 4A is a schematic perspective view of the scanner 4 illustrating a state in which the document table 41 is removed from the casing 4a. FIG. 4B is an enlarged perspective view illustrating a portion of a lock receiving member 44 provided in the optical scanning unit 40 housed in the scanner 4.

As illustrated in FIG. 3, the document table 41 serving as the document placement face of the casing 4a of the scanner 4 includes the exposure glass 7, the DF exposure glass 71, and a lock member 42 as a restraint. Furthermore, as illustrated in FIG. 4A, the optical scanning unit 40 is housed in the scanner 4. The optical scanning unit 40 moves in the direction indicated by arrow B along a guide rod 43 to read the document placed on the exposure glass 7. As illustrated in FIG. 4B, the lock receiving member 44 as a restraint receiver is provided in the optical scanning unit 40. The lock receiving member 44 is engaged with the above-described lock member 42 to prevent the optical scanning unit 40 from inadvertently moving in the direction indicated by arrow B, for example, at the time of the transport of the scanner 4.

Figure 5:
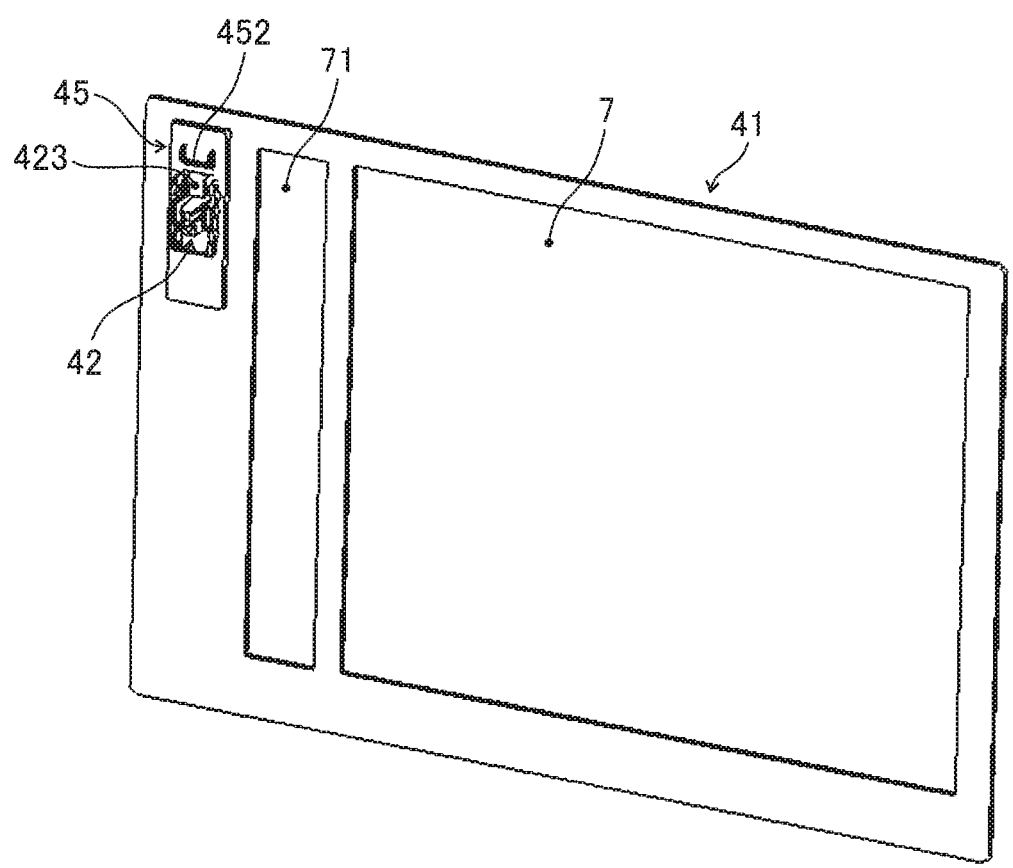
FIG. 5 is a perspective view of the document table removed from a casing of the scanner as viewed from a back side.
Figure 6:
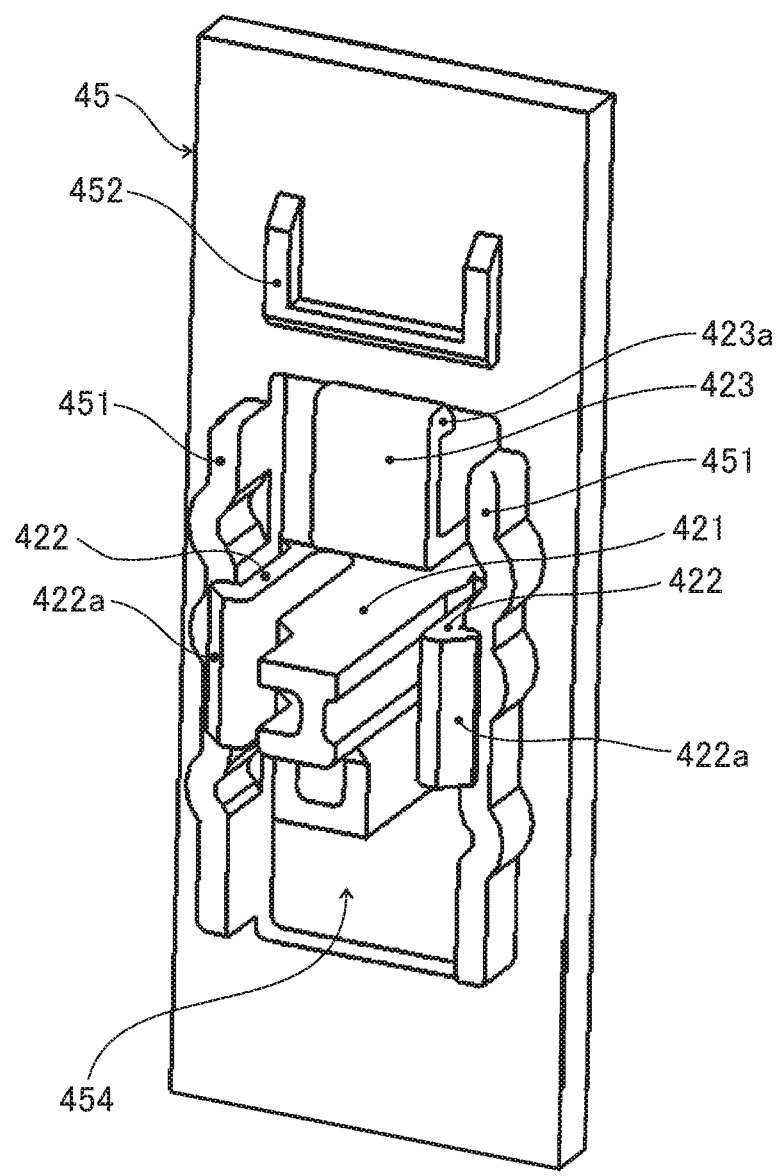
FIG. 6 is an enlarged perspective view illustrating a portion of a lock member and a lock member holding portion holding the lock member on the document table in FIG. 5.
Figure 7:
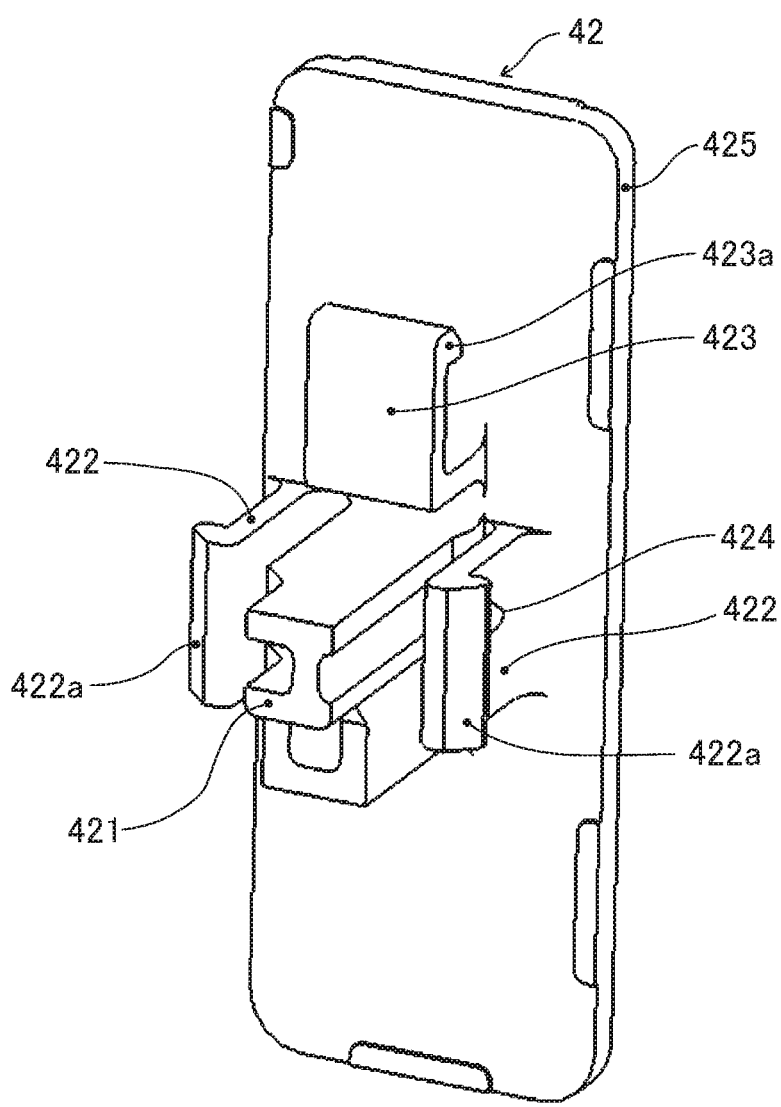
FIG. 7 is a perspective view of the lock member.
Figure 8A:
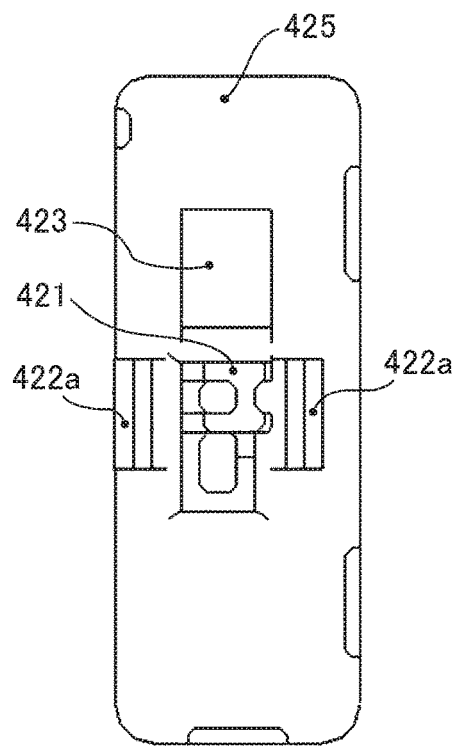
FIG. 8A is a front view of the lock member.
Figure 8B:
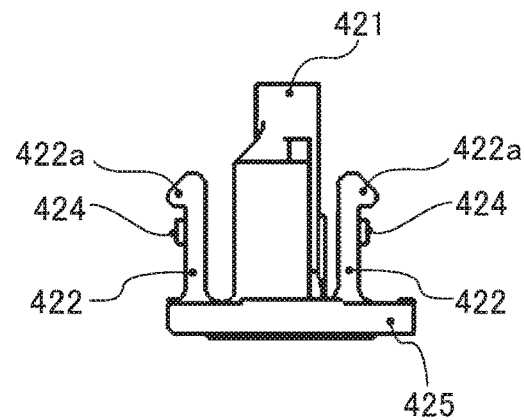
FIG. 8B is a bottom view of the lock member.
Figure 8C:
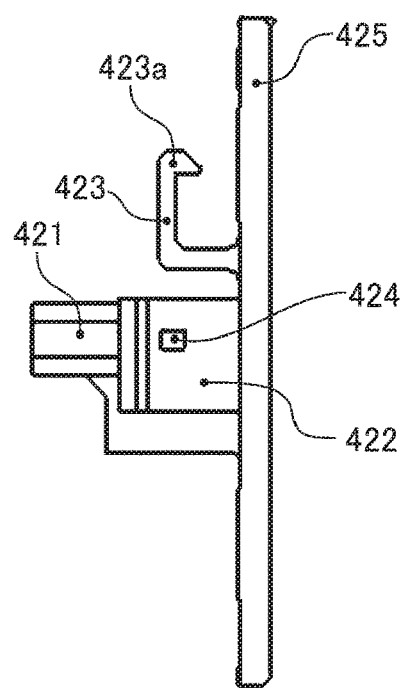
FIG. 8C is a side view of the lock member.
Figure 9:
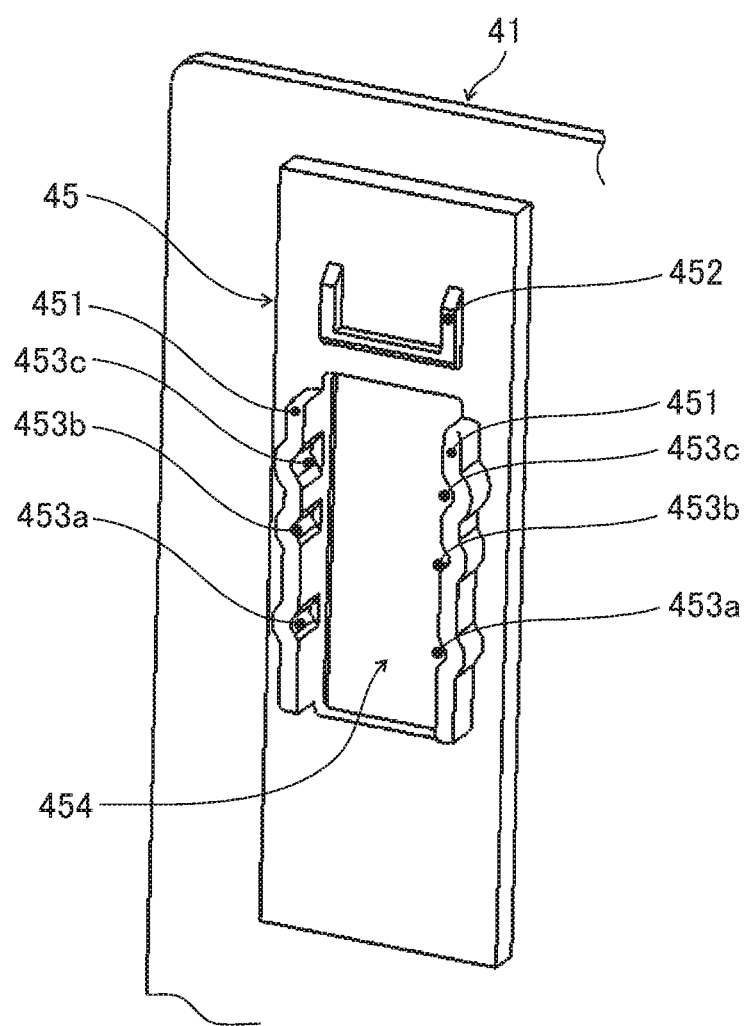
FIG. 9 is a perspective view of the lock member holding portion when the lock member is not attached.

FIG. 5 is a perspective view of the document table 41 removed from the casing 4a of the scanner 4 as viewed from a back side. FIG. 6 is an enlarged perspective view illustrating a portion of the lock member 42 and a lock member holder 45 (a restraint holder) that holds the lock member 42 on the document table 41 in FIG. 5. FIG. 7 is a perspective view of the lock member 42. FIG. 8A is a front view of the lock member 42, FIG. 8B is a bottom view of the lock member 42, and FIG. 8C is a side view of the lock member 42. FIG. 9 is a perspective view of the lock member holder 45 when the lock member 42 is not attached.

As illustrated in FIGS. 7 and 8A to 8C, the lock member 42 includes a lock portion 421 as an engaging portion and two anti-loose snap-fit portions 422 as snap-fit portions. The lock member 42 also includes a position securing snap-fit portion 423 as a securing portion, two protruding portions 424, and an operation portion 425. The lock portion 421 is engaged with the lock receiving member 44 provided in the optical scanning unit 40 described above to lock the optical scanning unit 40 such that the optical scanning unit 40 does not move. Claw portions 422a facing outward are formed at distal end portions of the two respective anti-loose snap-fit portions 422. In addition, one protruding portion 424 is formed on each of outer side of the two anti-loose snap-fit portions 422. The protruding portion 424 fits into one of a first recess 453a, a second recess 453b, and a third recess 453c of the lock member holder 45 illustrated in FIG. 9, such that the lock member 42 is positioned at either position in a movement direction of the lock member 42.

The protruding portions 424 of the lock member 42 and the first recesses 453a, the second recesses 453b, and the third recesses 453c of the lock member holder 45 serve as positioning portions to determine a position of the lock member 42. To slide the lock member 42, the two anti-loose snap-fit portions 422 are deflected inward to release the protruding portions 424 from the first recesses 453a, the second recesses 453b, or the third recesses 453c. As a consequence, the lock member 42 can move smoothly. In addition, with such a configuration, when a user slides the lock member 42 to move, the user can feel a proper click feeling.

As illustrated in FIG. 9, the lock member holder 45 includes two lock member receptacles 451 as female-shaped receiving portions and a position securing snap-fit receptacle 452 as a holding portion. The lock member holder 45 also includes the first recess 453a, the second recess 453b, and the third recess 453c on an inner side of each of the two lock member receptacles 451, and a holding hole portion 454 as a slot. The first recesses 453a, the second recesses 453b, and the third recesses 453c are respectively provided on the inner side of the two lock member receptacles 451. Thus, six recesses in total are provided along the movement direction of the lock member 42. The position securing snap-fit receptacle 452 as a female-shaped receiving portion and the position securing snap-fit portion 423 of the lock member 42 together secure the lock member 42 at an unlock securing position (second unlock position). Although the lock member 42 has a claw portion and the lock member holder 45 has a catch portion on which the claw portion is latched in the illustrated example, alternatively, the lock member holder 45 can have a claw portion and the lock member 42 can has a catch portion. Furthermore, the holding hole portion 454 functions as a slot in which the lock member 42 can move.

The first recesses 453a are formed at positions corresponding to a restricting position at which the movement of the optical scanning unit 40 is restricted owing to the lock portion 421 of the lock member 42 that engages with the lock receiving member 44 provided in the optical scanning unit 40 when the protruding portions 424 of the lock member 42 are fit in the first recesses 453a. In the following description, the above-mentioned restricting position is referred to as a lock cancel position.

The second recesses 453b are formed at positions corresponding to a first unlock position at which the movement of the optical scanning unit 40 is not restricted because the lock portion 421 does not engage with the lock receiving member 44 when the protruding portions 424 are fit in the second recesses 453b. In the following description, the above-mentioned first unlock position is also referred to as a lock cancel position.

The third recesses 453c are formed at positions at which the lock member 42 is positioned at the second unlock position (unlock securing position) when the protruding portions 424 are fit in the third recesses 453c. The lock portion 421 being in the second unlock position (unlock securing position) does not engage with the lock receiving member 44 and does not restrict the movement of the optical scanning unit 40. In the second unlock position, the position of the lock member 42 itself is secured. In the following description, the above-mentioned second unlock position is referred to as the unlock securing position.

Note that the force for inserting or removing the protruding portions 424 into or from the first recesses 453a and the second recesses 453b is smaller than the force for inserting or removing the protruding portions 424 into or from the third recesses 453c. With this configuration, the force for moving the lock member 42 to the lock position and to the lock cancel position and the force for moving the lock member 42 from these positions can be smaller than the force for moving the lock member 42 to the unlock securing position. Accordingly, the click feeling produced by the lock member 42 at the lock position and the lock cancel position is decreased, such that the operability of the user is improved. As an example of this configuration, for example, the depth of the third recess 453c is made shallower than the depths of the first recess 453a and the second recess 453b and the gap between the third recess 453c and the protruding portion 424 is made smaller.

As illustrated in FIG. 6, the two anti-loose snap-fit portions 422 of the lock member 42 are inserted into the holding hole portion 454 of the lock member holder 45 from a front side (document placement face side) of the document table 41 to be fit into the holding hole portion 454, such that the lock member 42 is held by the lock member holder 45. The claw portions 422a facing the outside of the two anti-loose snap-fit portions 422 function as retainer contacts respective end faces of the lock member receptacles 451 so as to prevent the lock member 42 from loosening and coming off from the lock member receptacles 451. Furthermore, the lock member 42 is held slidably in a vertical direction in FIG. 6 and the illustrated example depicts a state in which the protruding portions 424 of the lock member 42 are fit into the second recesses 453b of the lock member holder 45 and the lock member 42 is located at the lock cancel position.

When the lock member 42 moves downward from the state illustrated in FIG. 6, the protruding portions 424 of the lock member 42 are fit into the first recesses 453a of the lock member holder 45 and the lock member 42 moves to the lock position. On the other hand, when the lock member 42 moves upward from the state illustrated in FIG. 6, the protruding portions 424 of the lock member 42 are fit into the third recesses 453c of the lock member holder 45 and the lock member 42 moves to the unlock securing position. When the lock member 42 moves to the unlock securing position, a claw portion 423a at a distal end of the position securing snap-fit portion 423 is simultaneously engaged with the position securing snap-fit receptacle 452 of the lock member holder 45. Then, the position of the lock member 42 is secured at the unlock securing position and the lock member 42 is no longer allowed to move to the lock cancel position or the lock position. Consequently, unnecessary securing of the optical scanning unit 40 due to erroneous operation by the user is surely prevented.

FIGS. 10A and 10B are explanatory views for explaining the regulation of the movement of the optical scanning unit 40 by the lock member 42; FIG. 10A is a perspective view illustrating an unlocked state before the movement is restricted by the lock member 42 and FIG. 10B is a perspective view illustrating a locked state in which the movement is restricted by the lock member 42. In FIGS. 10A and 10B, illustration of the casing 4a and the document table 41 is omitted for the sake of convenience.

As illustrated in FIG. 10A, when the lock member 42 is moved in the direction indicated by arrow while the optical scanning unit 40 is in the unlocked state, the lock portion 421 of the lock member 42 enters a groove portion 44a of the lock receiving member 44 to engage with the groove portion 44a, as illustrated in FIG. 10B. Since the movement direction of the optical scanning unit 40 (the scan advancing direction, see FIG. 2) is substantially orthogonal to the movement direction of the lock member 42, the lock member 42 can restrict the motion of the optical scanning unit 40 in the movement direction and regulate the movement of the optical scanning unit 40.

FIGS. 11A to 11C are explanatory views for explaining positional relationships of the lock member 42 with respect to the lock member holder 45 of the document table 41, which are partially enlarged perspective views of the document table 41 as viewed from the back side. FIGS. 12A to 12C are perspective views for explaining positional relationships between the lock member 42, and the lock receiving member 44 and the lock member holder 45. FIGS. 11A and 12A are views when the lock member 42 is at the lock position at which the movement of the optical scanning unit 40 is restricted. FIGS. 11B and 12B are views when the lock member 42 is located at the lock cancel position at which the movement of the optical scanning unit 40 is not restricted. FIGS. 11C and 12C are views when the lock member 42 is located at the unlock securing position at which the movement of the optical scanning unit 40 is not restricted and the position of the lock member 42 is secured. In FIGS. 12A, 12B, and 12C, illustration of the casing 4a is omitted for the sake of convenience.

At the lock position of the lock member 42 illustrated in FIGS. 11A and 12A, as described above, the lock portion 421 of the lock member 42 is engaged with the lock receiving member 44, such that the movement of the optical scanning unit 40 in the scan advancing direction is locked. When locking the optical scanning unit 40 is unnecessary, the user operates the operation portion 425 to move the lock member 42 from the lock position to the lock cancel position illustrated in FIGS. 11B and 12B.

At the lock cancel position, the lock of the optical scanning unit 40 by the lock member 42 is canceled and the optical scanning unit 40 can move in the scan advancing direction. In addition, in the lock cancel position, the user can operate the operation portion 425 to move the lock member 42 to the lock position or the unlock securing position illustrated in FIGS. 11C and 12C.

When the lock member 42 moves to the unlock securing position, the claw portion 423a at the distal end of the position securing snap-fit portion 423 is engaged with the position securing snap-fit receptacle 452 of the lock member holder 45, as illustrated in FIG. 11C. Since the claw portion 423a at the distal end of the position securing snap-fit portion 423 and the position securing snap-fit receptacle 452 are not easily disengaged, the position of the lock member 42 is secured at the unlock securing position. Then, the lock member 42 is no longer able to move back to the lock cancel position or the lock position. Consequently, unnecessary securing of the optical scanning unit 40 due to erroneous operation by the user is surely prevented.

Figure 13:
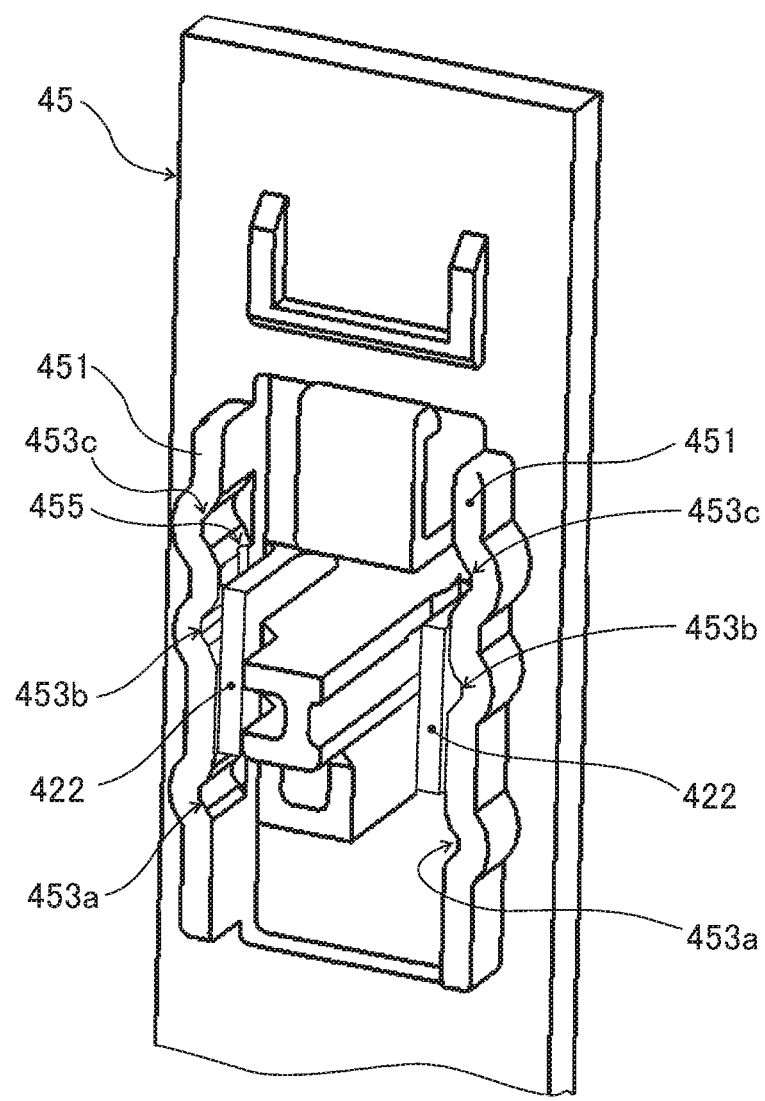
FIG. 13 is a perspective view of the lock member holding portion and the lock member illustrating another example of a retainer.

FIG. 13 is a perspective view of the lock member holder 45 and the lock member 42 illustrating another example of the retainer that prevents the lock member 42 from loosening off from the lock member holder 45.

Figure 14:
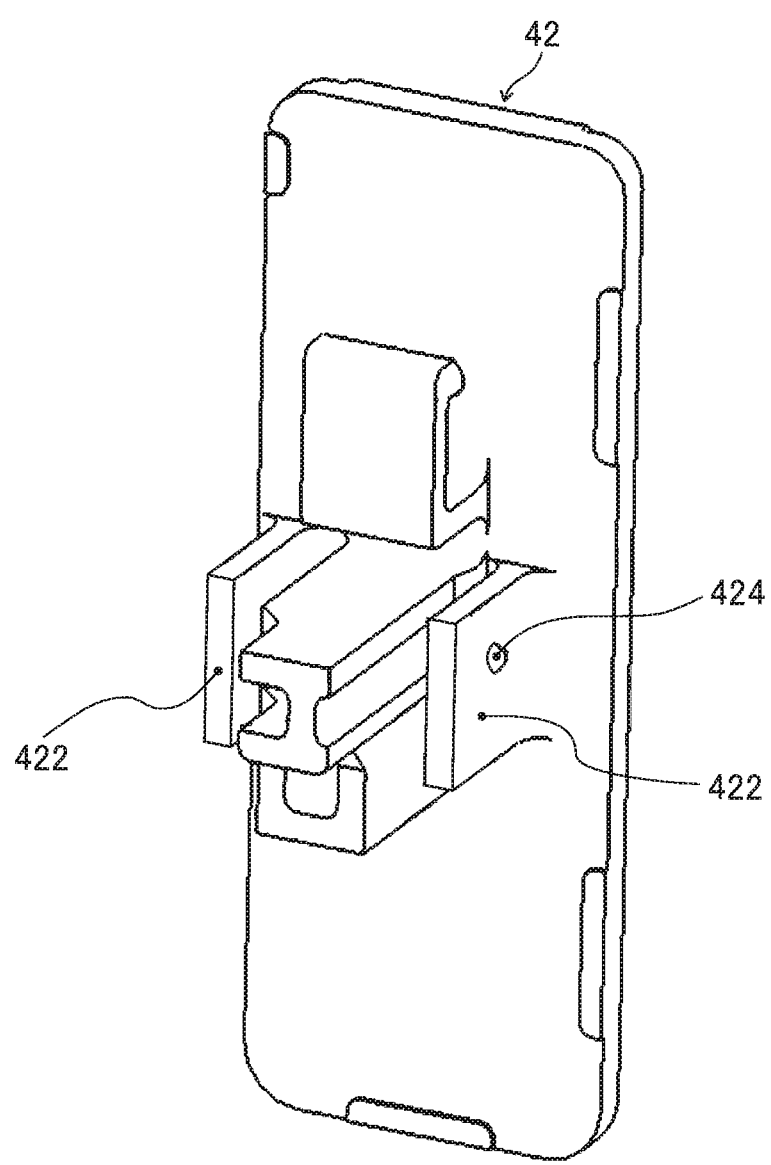
FIG. 14 is a perspective view of the lock member in FIG. 13.

FIG. 14 is a perspective view of the lock member 42 in FIG. 13.

As illustrated in FIG. 14, the protruding portions 424 are formed in the two anti-loose snap-fit portions 422 of the lock member 42 according to the present example, but no claw portions at the distal end are formed. In addition, as illustrated in FIG. 13, slide grooves 455 as anti-loose recesses are formed inside the two respective lock member receptacles 451 of the lock member holder 45, into which the distal end portions of the protruding portions 424 of the lock member 42 enter to glide such that the lock member 42 can slide and move. The protruding portions 424 of the lock member 42 serve as anti-loose protruding portions.

Since the distal end portions of the protruding portions 424 enter the slide grooves 455 to glide, the lock member 42 can slide and move to the respective positions of the lock position, the lock cancel position, and the unlock securing position. Furthermore, since the protruding portions 424 enter the slide grooves 455 during the sliding movement, the lock member 42 is prevented from loosening off from the lock member holder 45.

When the lock member 42 is positioned at the lock position, the protruding portions 424 fit into the first recesses 453a to prevent the lock member 42 from loosening off. Likewise, when the lock member 42 is positioned at the lock cancel position, the protruding portions 424 fit into the second recesses 453b to prevent the lock member 42 from loosening off. Additionally, when the lock member 42 is positioned at the unlock securing position, the protruding portions 424 fit into the third recesses 453c to prevent the lock member 42 from loosening off. In this manner, the first recesses 453a, the second recesses 453b, and the third recesses 453c also function as anti-loose recesses that prevent the lock member 42 from loosening off.

As described above, the protruding portions 424 of the lock member 42, and the slide grooves 455, the first recesses 453a, the second recesses 453b, and the third recesses 453c formed inside the lock member receptacles 451 of the lock member holder 45 serve as a retainer. Furthermore, since no claw portions are formed at the distal ends of the anti-loose snap-fit portions 422 of the lock member 42, downsizing of the lock member 42 and reduction in the manufacturing cost are achieved.

In the above-described embodiment, the protruding portions 424 are provided in the lock member 42 and the first recesses 453a, the second recesses 453b, and the third recesses 453c are provided in the lock member holder 45. However, the embodiment is not limited to this configuration. For example, three protruding portions may be provided in the lock member holder 45 such that one recess is provided in the lock member 42 and one of the protruding portions fits into this recess to position the lock member 42 at a predetermined position. The protruding portions 424 of the lock member 42 also function to prevent the lock member 42 from loosening off; however, an anti-loose protruding portion may be provided separately from the protruding portions 424 such that the slide groove 455 slidably fit with the anti-loose protruding portion.

In a configuration in which an optical scanning unit (scanning carriage), which is a component of a scanner module, is secured at the time of product transportation such that the optical scanning unit is protected from impact at the time of transportation (hereinafter also referred to as "carriage lock"), techniques in which a document pressing portion is opened and closed to release the carriage lock are known. In such an image reading device, when the document pressing portion such as the ADF is closed, an actuator of the carriage lock projecting from a casing of the scanner module is pressed into the inside of the casing and the carriage lock is canceled. Therefore, a cushioning material is inserted between the document pressing portion and an exposure glass at the time of product transportation, such that the actuator of the carriage lock is not pressed into the inside of the casing and the carriage lock is not released even when the document pressing portion is closed.

However, since the carriage lock mechanism described above is configured so as to release the carriage lock in conjunction with the action of closing the document pressing portion after removing the cushioning material, an additional protection member, namely, the cushioning material is required, resulting in an increase in cost. In addition, since the released state of the carriage lock is maintained by the frictional force between the actuator and a bearing holding the actuator, there is a possibility of returning to the locked state due to an unexpected impact or erroneous operation by the user. With the above-described carriage lock mechanism, taking a position between the lock position and the lock cancel position is not considered. The lock mechanism of the present embodiment does not require an additional protection member such as the cushioning material and does not return to the lock position by impact. The lock member 42 of the present embodiment can take a position (lock cancel position) between the lock position and the unlock securing position.

First Modification

Figure 15:
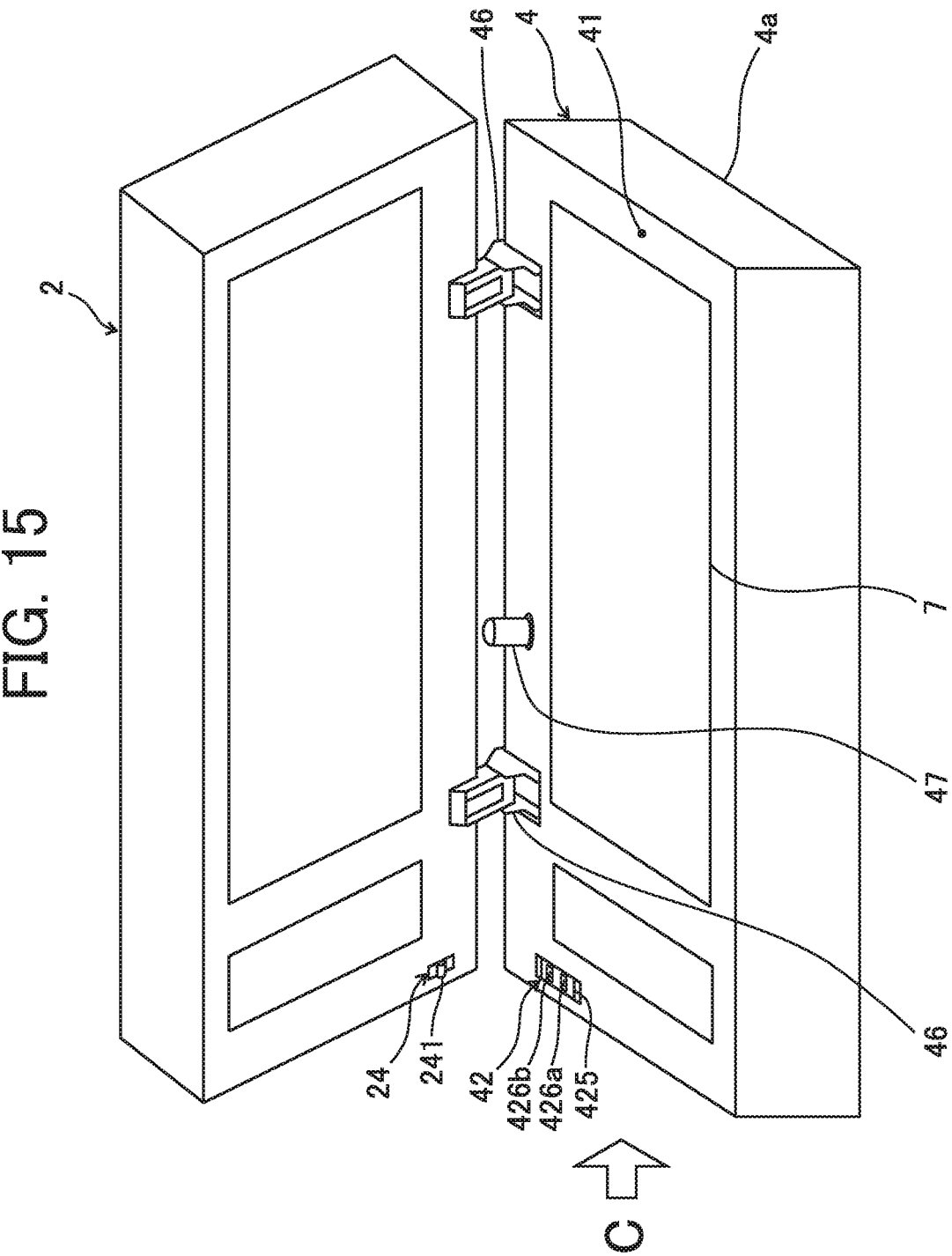
FIG. 15 is a perspective view of an automatic document feeder (ADF) and a scanner when the ADF is opened to expose a document placement face in the color copier according to a first modification.

Next, a configuration capable of detecting that the operation portion 425 of the lock member 42 is located at the lock cancel position (first unlock position) by the action of closing the ADF 2 will be described. With this configuration, the user is reliably prevented from scanning the document on the exposure glass 7 and moving the optical scanning unit 40 while the operation portion 425 of the lock member 42 is in the lock cancel position. FIG. 15 is a perspective view of the ADF 2 and the scanner 4 when the ADF 2 is opened to expose a document placement face in the color copier 1 according to the first modification.

As illustrated in FIG. 15, the ADF 2 is attached to the scanner 4 so as to be freely opened and closed via a pair of hinges 46. As the document is placed on the exposure glass 7 of the scanner 4 and the ADF 2 is closed as illustrated in FIG. 15, the document can be pressed against the exposure glass 7. Furthermore, when a thick document such as a book is read, the side of the hinges 46 of the ADF 2 is raised by the action of the hinges 46 having a lift mechanism and the ADF 2 is kept as horizontal as possible to uniformly press the document against the exposure glass 7. Note that a member to press the document against the exposure glass 7 is not limited to the above ADF 2 and may be a plain pressure plate without the ADF function.

The casing 4a of the scanner 4 is provided with a push switch 47 as an open-close detector that detects the open/closed state of the ADF 2 and an actuator, which is a movable portion of the push switch 47, is arranged to be exposed from the document table 41 toward the upper side in FIG. 15. When the ADF 2 is closed, a lower surface of the ADF 2 pushes the actuator of the push switch 47 into the inside of the switch, such that the contact of the push switch 47 is turned ON and the closed state of the ADF 2 is detected. In contrast to this, when the ADF 2 is opened, the lower surface of the ADF 2 comes away from the actuator of the push switch 47 and the actuator is pushed out by the biasing force of a spring inside the switch, such that the contact of the push switch 47 is turned OFF and the open state of the ADF 2 is detected.

Figure 16:
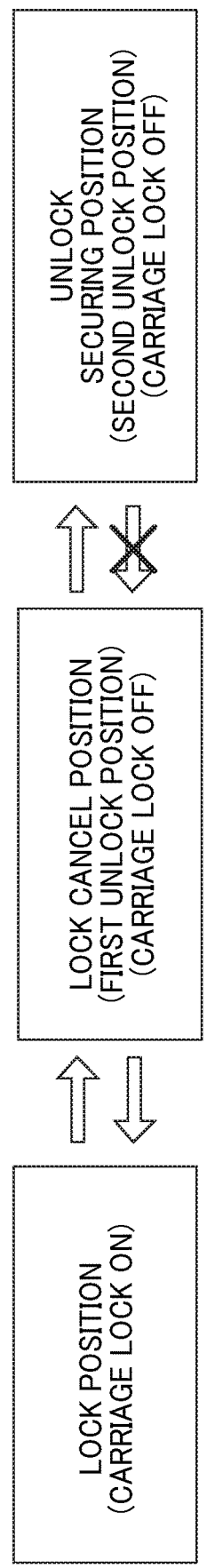
FIG. 16 is an explanatory diagram for explaining a relationship between movable directions at respective positions of the lock member.

FIG. 16 is an explanatory diagram for explaining a relationship between movable directions at respective positions of the operation portion 425 of the lock member 42. The lock member 42 of the first modification has an action similar to the action described with reference to FIGS. 12A to 12C and other drawings but will be briefly described.

The operation portion 425 of the lock member 42 can take three positions: the lock position, the lock cancel position (first unlock position), and the unlock securing position (second unlock position). At the lock position, the lock member 42 locks the movement of the optical scanning unit 40 in the scan advancing direction and the carriage lock is in an ON state. The operation portion 425 of the lock member 42 can move to the lock cancel position. In the lock cancel position, the carriage lock is in an OFF state in which the lock of the movement of the optical scanning unit 40 by the lock member 42 is canceled and the optical scanning unit 40 can move in the scan advancing direction. The operation portion 425 of the lock member 42 can move to the lock position and the unlock securing position. In the unlock securing position, the carriage lock is in the OFF state and the optical scanning unit 40 can move in the scan advancing direction. Since the claw portion 423a at the distal end of the position securing snap-fit portion 423 is engaged with the position securing snap-fit receptacle 452 of the lock member holder 45, the lock member 42 is secured at the unlock securing position and prevented from moving to the lock cancel position (see FIG. 11C). As described above, the operation portion 425 of the lock member 42 can move between the lock position and the lock cancel position and move from the lock cancel position to the unlock securing position; however, after having moved to the unlock securing position, the operation portion 425 is secured at the unlock securing position and prevented from returning to the lock cancel position.

As illustrated in FIG. 15, the operation portion 425 of the lock member 42 of the first modification is provided on the side of the hinges 46 on a rear side of the scanner 4. A lock fitting member 24 having a fitting convex portion 241 is provided on a lower surface side of the ADF 2 opposing the operation portion 425 of the lock member 42 when the ADF 2 is closed.

Figure 17:
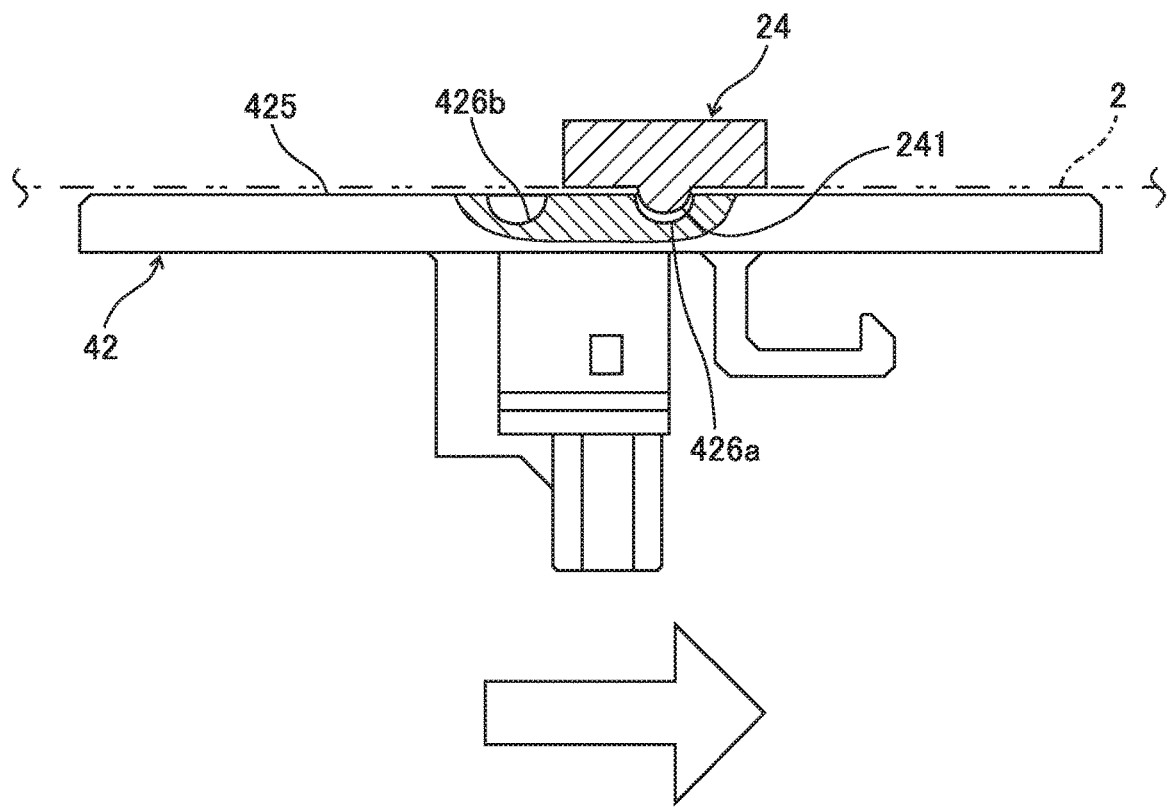
FIG. 17 is a cross-sectional view of a lock fitting member and the operation portion of the lock member as viewed from the direction indicated by arrow C in FIG. 15 while the ADF is closed and the operation portion of the lock member is at the lock position.

FIG. 17 is a cross-sectional view of the lock fitting member 24 and the operation portion 425 of the lock member 42 as viewed from the direction indicated by arrow C in FIG. 15 while the ADF 2 is closed and the operation portion 425 of the lock member 42 is at the lock position. The operation portion 425 of the lock member 42 includes a lock position concave portion 426a and an unlock securing position concave portion 426b which can be fit with the fitting convex portion 241 while the ADF 2 is closed.

As illustrated in FIG. 17, when the ADF 2 is closed while the operation portion 425 of the lock member 42 is at the lock position, the fitting convex portion 241 of the lock fitting member 24 is fit with the lock position concave portion 426a of the operation portion 425. In transportation, the scanner 4 is transported while the lock member 42 locks the movement of the optical scanning unit 40 in the scan advancing direction, but a protection member is not required between the exposure glass 7 and the ADF 2. In addition, in FIG. 17, when the ADF 2 is opened and the operation portion 425 of the lock member 42 is slid to the right side in FIG. 17, the operation portion 425 moves to the unlock securing position side (the lock cancel position side).

Figure 18:
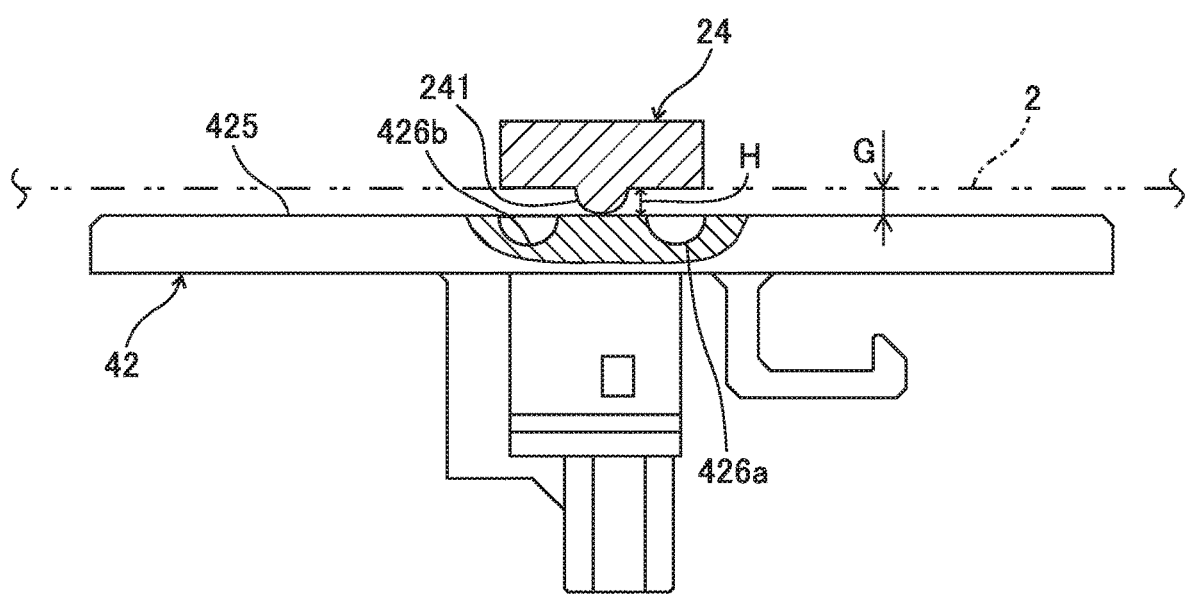
FIG. 18 is a cross-sectional view of the lock fitting member and the operation portion of the lock member as viewed from the direction indicated by arrow C in FIG. 15 while the ADF is closed and the operation portion of the lock member is in the unlock position.

FIG. 18 is a cross-sectional view of the lock fitting member 24 and the operation portion 425 of the lock member 42 as viewed from the direction indicated by arrow C in FIG. 15 while the ADF 2 is closed and the operation portion 425 of the lock member 42 is in the unlock position.

The operation portion 425 of the lock member 42 has no recess that can be fit with the fitting convex portion 241 of the lock fitting member 24 when the ADF 2 is closed while being in the unlock position. Therefore, the fitting convex portion 241 of the lock fitting member 24 and the operation portion 425 of the lock member 42 interfere with each other and the ADF 2 is elevated by a height H of the fitting convex portion 241 by the lift mechanism of the hinges 46, as compared with the state in FIG. 17. With the elevation of the ADF 2, the user can notice that the position (state) of the operation portion 425 of the lock member 42 is abnormal (in the unlock position) and the user is urged to first open the ADF 2 and then slide the operation portion 425 to move to the unlock securing position.

Furthermore, as illustrated in FIG. 15, the operation portion 425 of the lock member 42 and the lock fitting member 24 are disposed at positions close to a rotation axis of the hinges 46. Therefore, compared with a case where the operation portion 425 of the lock member 42 and the lock fitting member 24 are disposed at a position far from the rotation axis of the hinges 46, an elevation amount G between the exposure glass 7 and the ADF 2 when the ADF 2 is closed and the fitting convex portion 241 interferes with the operation portion 425 increases on the front side of the device. In addition, as compared with a case where the operation portion 425 of the lock member 42 and the lock fitting member 24 are disposed at a position far from the rotation axis of the hinges 46, the fitting convex portion 241 interferes with the operation portion 425 at a stage earlier than the action of closing the ADF 2. With these phenomena, it becomes easier for the user to perceive abnormality.

However, since the operation portion 425 of the lock member 42 being in the unlock position can move to the lock position and the unlock securing position, there is a possibility that the operation portion 425 moves to the lock position side due to erroneous operation. When the operation portion 425 of the lock member 42 moves from the unlock position to the lock position side, there is a possibility that the lock portion 421 of the lock member 42 is engaged with the lock receiving member 44 to lock the movement of the optical scanning unit 40 in the scan advancing direction. Then, there is a possibility that, when a driving motor of the optical scanning unit 40 is activated, the optical scanning unit 40 is not allowed to move in the scan advancing direction such that an excessive load is applied to a driving mechanism, or the carriage lock is freed by the driving force such that the optical scanning unit 40 suddenly starts moving. As a result, there is a possibility that failures such as overload of the driving motor, abrasion of a gear, or impact to the optical scanning unit 40 occur.

According to the first modification, when setting the document on the exposure glass 7 and closing the ADF 2, the user notices that the operation portion 425 of the lock member 42 is in the unlock position because of the elevation of the ADF 2 and can temporarily interrupt scanning of the document. Then, the user moves the operation portion 425 of the lock member 42 to the unlock securing position to ensure that the movement of the optical scanning unit 40 in the scan advancing direction is not locked and then resumes scanning of the document, whereby the occurrence of the above-mentioned failures is reliably prevented.

Figure 19:
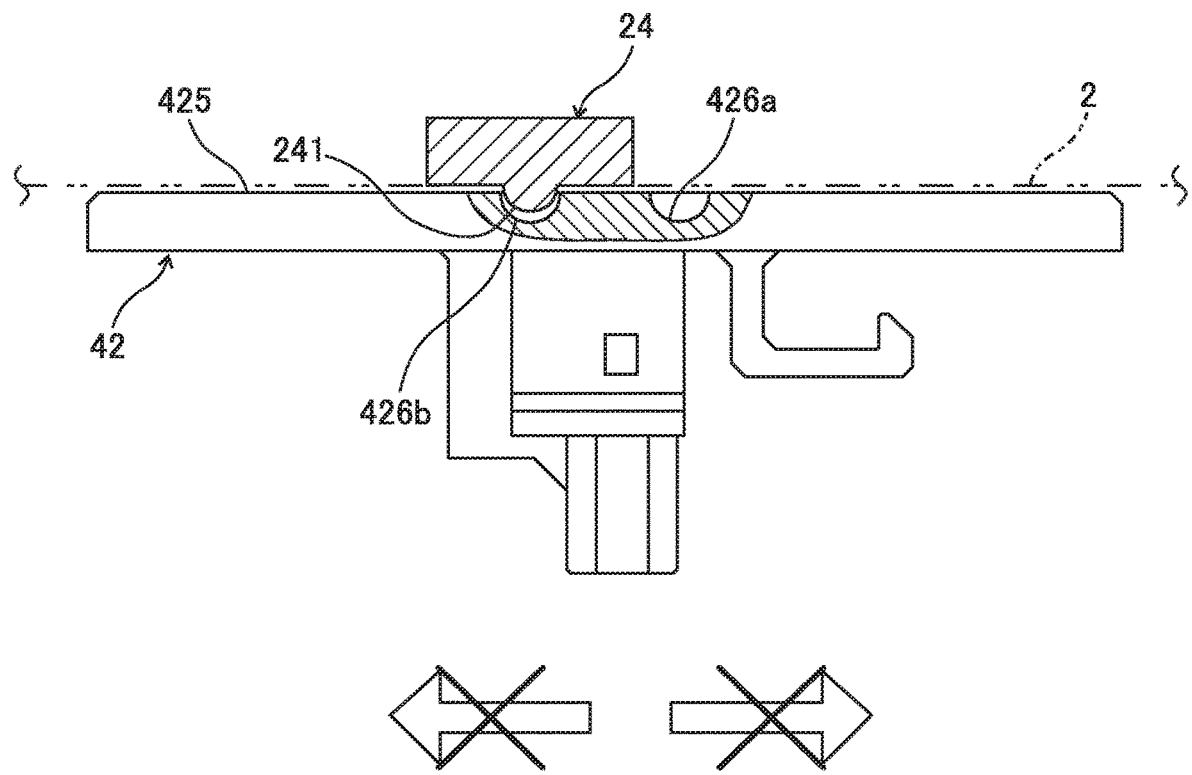
FIG. 19 is a cross-sectional view of the lock fitting member and the operation portion of the lock member as viewed from the direction indicated by arrow C in FIG. 15 while the ADF is closed and the operation portion of the lock member is in the unlock securing position.

FIG. 19 is a cross-sectional view of the lock fitting member 24 and the operation portion 425 of the lock member 42 as viewed from the direction indicated by arrow C in FIG. 15 while the ADF 2 is closed and the operation portion 425 of the lock member 42 is in the unlock securing position.

As illustrated in FIG. 19, when the ADF 2 is closed while the operation portion 425 of the lock member 42 is in the unlock securing position, the fitting convex portion 241 of the lock fitting member 24 is fit with the unlock securing position concave portion 426b of the operation portion 425 of the lock member 42. As described earlier, when the operation portion 425 of the lock member 42 is moved to the unlock securing position, the operation portion 425 is secured at that position and is no longer allowed to slide and move to the left of FIG. 19 and return to the unlock position side.

Here, the height H of the fitting convex portion 241 of the lock fitting member 24 may be set to a relatively large value and the fitting convex portion 241 of the lock fitting member 24 and the operation portion 425 may be disposed at a position close to the rotation axis of the hinges 46. With this structure, it can be detected by the push switch 47 that the operation portion 425 of the lock member 42 is currently in the unlock position. In other words, the height H of protruding is set such that, when the ADF 2 is closed while the operation portion 425 of the lock member 42 is in the unlock position, the push amount by which the lower surface of the ADF 2 actuates the actuator of the push switch 47 is smaller than the push amount by which the lower surface of the ADF 2 turns on the contact.

Figure 20:
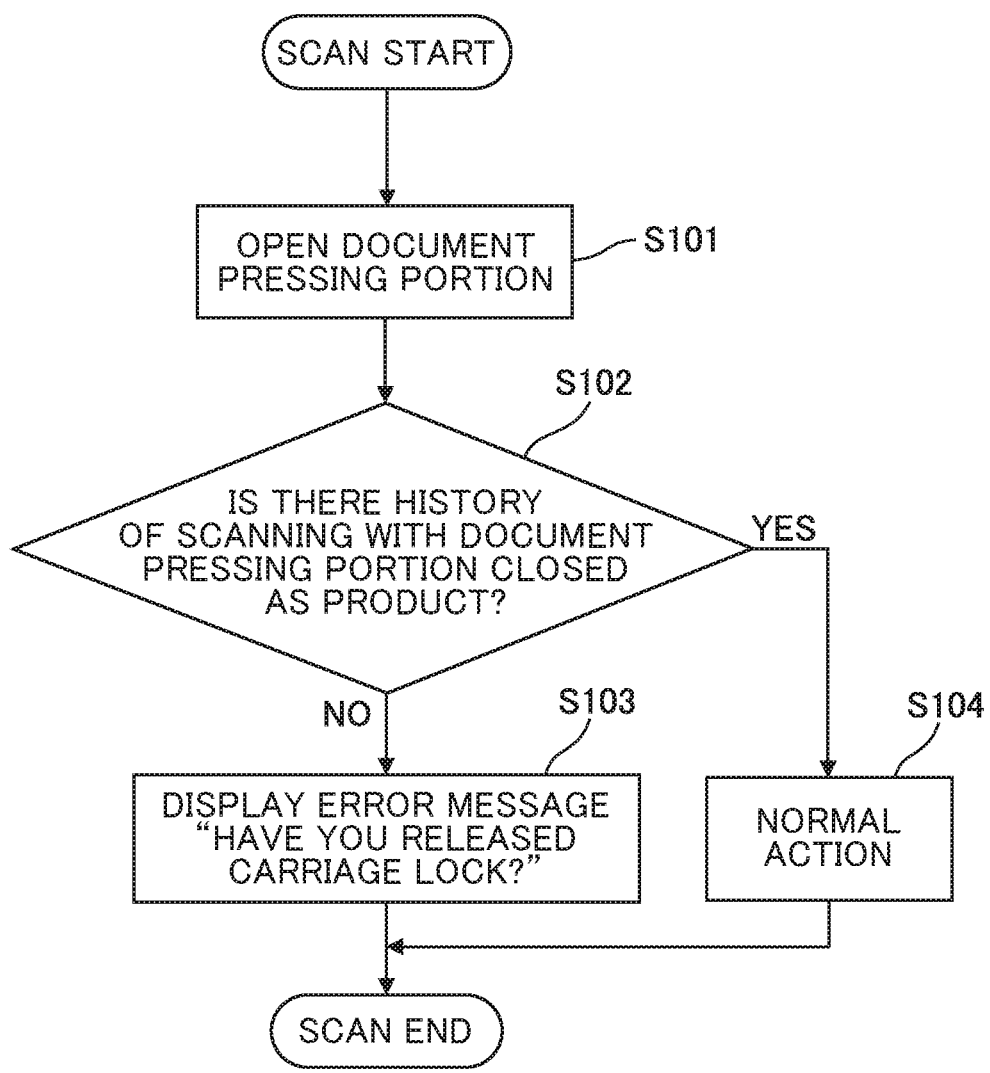
FIG. 20 is a flowchart of control according to an embodiment, for prompting a user to confirm that a carriage lock has been released when a document is placed on an exposure glass for the first time in the color copier and the optical scanning unit is moved in a scan advancing direction to scan.

For example, the push amount of the actuator by which the push switch 47 is turned on is specified as 3 mm, the actuator is arranged so as to project by 5 mm from the surface of the exposure glass 7, which has the same height as the surface of the lock member 42, and the height H of the fitting convex portion 241 is set to 3 mm. In this example, when the ADF 2 is closed while the operation portion 425 of the lock member 42 is in the unlock position, the fitting convex portion 241 contacts the operation portion 425 and the ADF 2 is elevated by the lift mechanism of the hinges 46. At this time, an elevation amount G of 3 mm is produced between the lower surface of the ADF 2 and the document placement face and the push amount of the actuator of the push switch 47 becomes 2 mm; accordingly, a push amount of 3 mm required to turn on the contact is not reached and thus the push switch 47 is not turned on. As a result, the push switch 47 electrically detects the open state of the ADF 2 although the ADF 2 is closed and it can be determined on software such as a sequence program that the operation portion 425 of the lock member 42 is currently in the unlock position. FIG. 20 is a flowchart of control for urging the user to confirm that the carriage lock has been released when a document is placed on the exposure glass 7 (a document reading face) for the first time in the color copier 1 and the optical scanning unit 40 is moved in the scan advancing direction to scan.

In FIG. 20, when the document is placed on the exposure glass 7 and the optical scanning unit 40 is moved in the scan advancing direction to scan, the document pressing portion such as the ADF 2 or a plain pressure plate is first opened (S101). At this time, the push switch 47 detects that the document pressing portion has been opened and a document pressing portion opening signal is input to a controller of the color copier 1. The controller to which the document pressing portion opening signal has been input refers to data stored in a memory and determines whether there is a history of scanning a document by moving the optical scanning unit 40 in the scan advancing direction with the document pressing portion closed (S102). When there is no scan history with the document pressing portion closed in the color copier 1 as a finished product after delivery to the user (NO in S102), since it is deemed that the optical scanning unit 40 is moved for the first time in the scan advancing direction, there is a probability that the carriage lock is not released. For this reason, the controller of the color copier 1 causes an error message "Have you released the carriage lock?" on a control panel 200 (illustrated in FIG. 1) or the like to call attention to the user (S103). The user can confirm whether the carriage lock has been released by looking at this error message. When the carriage lock is not released, the document pressing portion is opened and the operation portion 425 of the lock member 42 is moved to the unlock securing position. On the other hand, when there is a scan history with the document pressing portion closed (YES in S102), it is assumed that the carriage lock has already been released; accordingly, a normal scanning action is continued (S104) and the scan is ended.

The controller can be a processor including a central processing unit (CPU) and associated memory units such as a read only memory (ROM), a random access memory (RAM), etc. The processor performs various types of control processing by executing programs stored in the memory.

There is a case where a document pressing portion closing signal is not input to the controller from the push switch 47 despite that the document pressing portion is closed after the document pressing portion is opened in S101 above and the document pressing portion opening signal is input to the controller. This phenomenon occurs in a case where the document pressing portion such as the ADF 2 is elevated and the push switch 47 is not turned on due to a thick document and a case where the operation portion 425 of the lock member 42 is currently in the unlock position as described earlier and thus the push switch 47 is not turned on. Here, when there is no scan history with the document pressing portion closed, there is a high probability that the operation portion 425 of the lock member 42 is currently in the unlock position. Accordingly, when the document pressing portion closing signal is not input even after the lapse of a predetermined time, or when a scanning start signal is input before the document pressing portion closing signal is input, an error message "Have you moved the carriage lock to the unlock securing position?" may be displayed in S103 above.

In the first modification, the fitting convex portion 241 is formed in the ADF 2 and the lock position concave portion 426a and the unlock securing position concave portion 426b which can be fit with the fitting convex portion 241 are formed in the operation portion 425 of the lock member 42; however, the configuration may be reversed. That is, the fitting protruding portion may be formed in the operation portion 425 of the lock member 42 and the lock position recess and the unlock securing position recess which can be fit with the fitting protruding portion may be formed in the ADF 2. Also, with this configuration, the same action and effect are certainly obtained.

Second Modification

Figure 21:
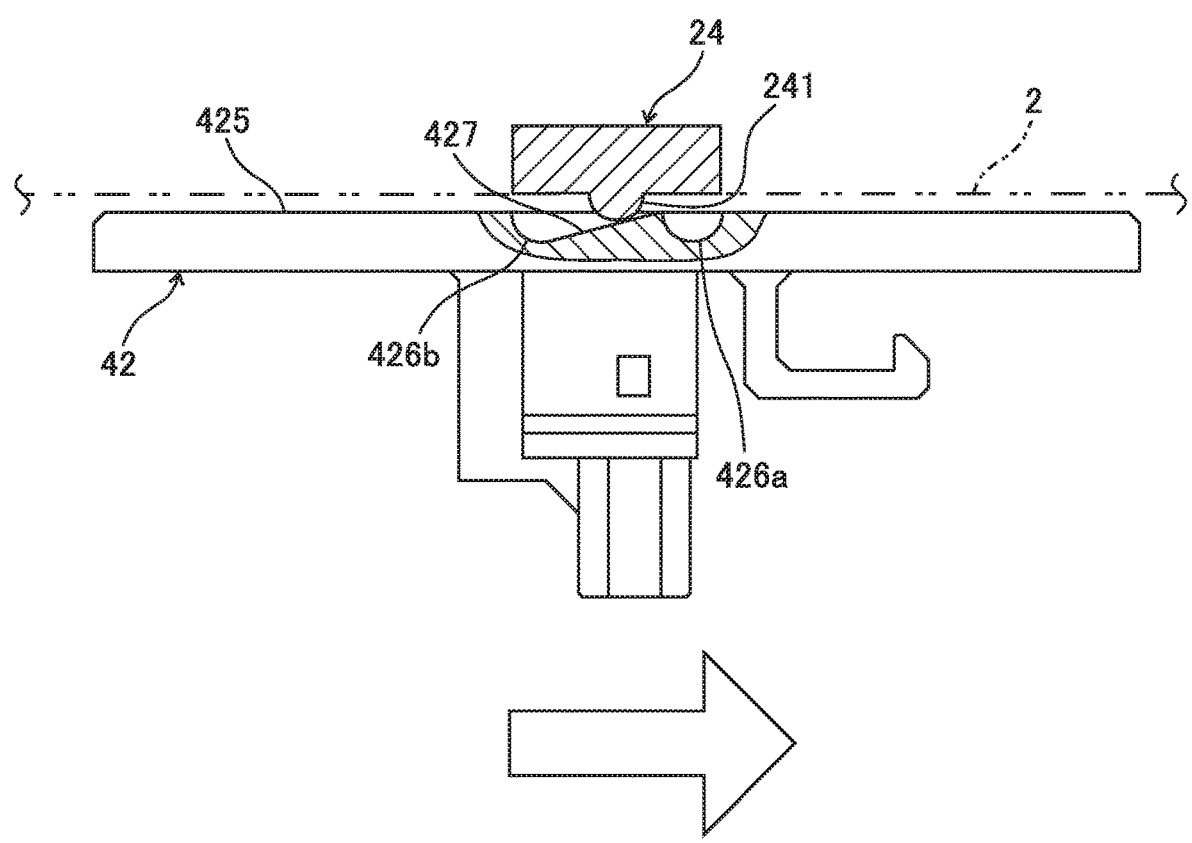
FIG. 21 is a cross-sectional view of the lock fitting member and the operation portion of the lock member as viewed from the direction indicated by arrow C in FIG. 15 in a state in which the operation portion of the lock member is in the unlock position while the ADF is shifting from an open state to a closed state in the color copier according to a second modification.

Next, a description will be given of a configuration in which the operation portion 425 of the lock member 42 is automatically moved to the unlock securing position (second unlock position) when the ADF 2 is closed while the operation portion 425 of the lock member 42 is located at the unlock position (first unlock position). FIG. 21 is a cross-sectional view of the lock fitting member 24 and the operation portion 425 of the lock member 42 as viewed from the direction indicated by arrow C in FIG. 15 in a state in which the operation portion 425 of the lock member 42 is in the unlock position while the ADF 2 is shifting from the open state to the closed state.

The operation portion 425 of the lock member 42 includes an inclined portion 427 that abuts against the fitting convex portion 241 of the lock fitting member 24 when the ADF 2 is closed while the operation portion 425 is in the unlock position such that a force for sliding movement in the right direction of FIG. 21 is imparted to the operation portion 425. The inclined portion 427 has an inclination toward the bottom of the unlock securing position concave portion 426*b*. When the fitting convex portion 241 abuts against the inclined portion 427 and then the ADF 2 is further closed, the operation portion 425 of the lock member 42 is slid and moved to the right of FIG. 21 and the fitting convex portion 241 is fit with the unlock securing position concave portion 426*b* such that the operation portion 425 is moved to the unlock securing position. With the inclined portion 427 of the operation portion 425 of the lock member 42 configured as described above, the operation portion 425 can be automatically moved from the unlock position to the unlock securing position in conjunction with the action of closing the ADF 2. Even while the operation portion 425 of the lock member 42 is in the unlock position, the operation portion 425 moves to the unlock securing position but will not move to the lock position side; accordingly, the occurrence of failures such as overload of the driving motor, abrasion of a gear, and impact to the optical scanning unit 40 are reliably prevented.

In the second modification, the fitting convex portion 241 is formed in the ADF 2 and the inclined portion 427 is formed in the operation portion 425 of the lock member 42; however, the configuration may be reversed. That is, the fitting protruding portion may be formed in the operation portion 425 of the lock member 42 and the inclined portion 427, the lock position recess, and the unlock securing position recess may be formed in the ADF 2. Also, with this configuration, the same action and effect are certainly obtained.

In the first and second modifications described above, the configuration in which the operation portion 425 of the lock member 42 takes the three states of the lock position, the unlock position, and the unlock securing position has been described. However, the slide type lock mechanism can be applied to a lock mechanism having a configuration that takes two states of the locked state and the unlocked state. In other words, the operation portion 425 of the lock member 42 is positioned in two states, namely, the locked state as being at the lock position and the unlocked state as being at the unlock securing position such that an arbitrary position between the locked state and the unlocked state can be taken without setting the unlock position in particular. In this configuration, there are cases where the scan is started regardless of the operation portion 425 of the lock member 42 being in the state between the locked state (lock position) and the unlocked state (unlock securing position) due to an accidental operation by the user. In this case, similar to the case described with reference to FIG. 18, when the ADF 2 is closed, the fitting convex portion 241 of the lock fitting member 24 and the operation portion 425 of the lock member 42 interfere with each other and the ADF 2 is elevated by the height H of the fitting convex portion 241, such that an elevation from the operation portion 425 is produced. With the elevation of the ADF 2, the user can notice that the position (state) of the operation portion 425 of the lock member 42 is abnormal (in a position between the locked state and the unlocked state) and the user is urged to slide the operation portion 425 to move to the unlocked state.

Furthermore, with the inclined portion 427 of the operation portion 425 of the lock member 42, even when the operation portion 425 is in a state between the locked state and the unlocked state, the operation portion 425 can be slid and moved to be brought into the unlocked state, as described with reference to FIG. 21. Consequently, the occurrence of the above-described failures is reliably prevented.

The configurations described thus far are merely examples and specific effects are exerted for each of the following aspects.

(Aspect A)

An image reading device such as the scanner 4 includes: an image reader such as the optical scanning unit 40 movable along an image reading face such as the document table 41; a restraint such as the lock member 42 to restrict movement of the image reader; and a casing such as the casing 4*a* in which the image reader is housed. The restraint includes the operation portion 425 disposed outside the casing and is held in the casing movably, with the operation portion 425, to a restricting position (lock position) to restrict movement of the image reader, a first unlock position at which restriction of movement of the image reader is canceled and from which movement to the restricting position is allowed, and a second unlock position at which the image reader is not restricted from moving and from which movement to the restricting position is less smooth than movement from the first unlock position.

According to this aspect, as described in the above embodiment, the user operates the operation portion to move the restraint between the restricting position and the first release position. With this configuration, the user can easily perform switching between the restricting position to prevent the image reader from moving and the unlock position to allow movement of the image reader. In addition, when it is desired to avoid a user's erroneous operation to lock the movement the image reader, the user can operate the operation portion to set the restraint at the second unlock position at which movement of the image reader is not restricted and from which movement to the restricting position is less smooth than movement from the first unlock position. Consequently, the image reader is less likely to be secured unnecessarily due to erroneous operation by the user. As described above, it becomes easier to switch between the restricting position at which the movement of the image reader is restricted and the release position in response to the operation by the user and the image reader is restrained from being unnecessarily secured due to erroneous operation by the user.

(Aspect B)

In the above aspect A, the restraint includes: the operation portion; an engaging portion such as the lock portion 421 engageable with an restraint receiver such as the lock receiving member 44 provided in the image reader; and a securing portion such as the position securing snap-fit portion 423 to be secured to a holding portion such as the position securing snap-fit receptacle 452 provided in the casing, and, when the restraint is moved to the second unlock position, the securing portion is secured to the holding portion of the casing to be secured at the unlock securing position and does not move to another position.

According to this aspect, as described in the above embodiment, when the restraint moves to the second unlock position, the securing portion is secured to the holding portion of the casing and secured at the second unlock position; accordingly, the restraint can be secured at the second unlock position with a simple configuration.

(Aspect C)

In the above aspect B, the casing includes a slot such as the holding hole portion 454 through which the restraint is movable while the engaging portion and the securing portion of the restraint are inserted, and the image reading device includes a retainer such as the anti-loose snap-fit portion 422 to prevent the restraint from loosening off from the slot.

According to this aspect, as described in the above embodiment, the restraint is movable along the slot without loosening off from the slot.

(Aspect D)

In the above aspect C, the retainer includes a snap-fit portion such as the anti-loose snap-fit portion 422 formed on one of the restraint and the casing, and a receiving portion such as the lock member receptacle 451 formed on the other one of the restraint and the casing to receive the snap-fit portion.

According to this aspect, as described in the above embodiment, anti-loosening for the restraint is implemented with a simple configuration.

(Aspect E)

In the above aspect C, the retainer includes an anti-loose protruding portion such as the protruding portion 424 provided on one of the restraint and the casing, and an anti-loose recess such as the slide groove 455 provided on the other one of the restraint and the casing to be slidably fit with the anti-loose protruding portion.

According to this aspect, as described in the above embodiment, the retainer can be simply formed with the anti-loose protruding portion and the anti-loose recess and, even when the restraint is moved, the fitting state is maintained and loosening is prevented, whereby downsizing of the restraint and reduction in the manufacturing cost are achieved.

(Aspect F)

In any of the above aspects A to E, the image reading device includes positioning portions to position the restraint at each of the restricting position, the first unlock position, and the second unlock position with respect to the casing.

According to this aspect, as described in the above embodiment, the restraint can be positioned at each of the restricting position, the first unlock position, and the second unlock position.

(Aspect G)

In the above aspect F, the positioner includes a protruding portion such as the protruding portion 424 provided on one of the casing and the restraint, and a recess such as the first recess 453a, the second recess 453b, or the third recess 453c provided on the other one of the casing and the restraint, into and from which the protruding portion is insertable and removable.

According to this aspect, as described in the above embodiment, the protruding portion fits into the recess and the restraint is positioned.

(Aspect H)

In the above aspect G, at least one of the protruding portion and the recess is disposed at a plurality of positions along a movement direction of the restraint.

According to this aspect, as described in the above embodiment, the restraint can be positioned at a plurality of positions in the movement direction of the restraint.

(Aspect I)

In the above aspect G or H, force for inserting or removing the protruding portion into or from the recess at the restricting position and the first unlock position is smaller than force for inserting or removing the protruding portion into or from the recess at the second unlock position.

According to this aspect, as described in the above embodiment, the force for moving the restraint to the restricting position and the first unlock position and the force for moving the restraint from these positions can be set smaller than the force for moving the restraint to the second unlock position. Accordingly, the click feeling produced by the restraint at the restricting position and the first unlock position is decreased, such that the operability of the user is improved.

(Aspect J)

In any of the above aspects A to I, the image reading device further includes a document pressing portion such as the ADF 2 openably and closably supported by the casing to press a document placed on the image reading face against the image reading face when the document pressing portion is closed; and a fitter such as the fitting convex portion 241 of the lock fitting member 24, the lock position concave portion 426a and the unlock securing position concave portion 426b, to cause the document pressing portion and the operation portion 425 to fit with each other when the document pressing portion is closed while the restraint is located at the restricting position and the second unlock position, in which, with the fitter, the document pressing portion and the operation portion interfere with each other when the document pressing portion is closed while the restraint is located at the first unlock position.

According to this aspect, as described in the first modification, once interference occurs when the document pressing portion is closed, the user can instantly recognize that the restraint is located at the first unlock position and moves the restraint to the second unlock position. Accordingly, since the restraint is secured at the second unlock position and the document is read while the movement of the image reader is not restricted, failures such as overload of the driving motor, abrasion of a gear, and impact to the image reader are reliably prevented. In addition, when the image reading device is transported with the movement of the image reader restricted by the restraint, a protection member such as a cushioning material sandwiched between the document pressing portion and the image reading face is not required.

(Aspect K)

In the above aspect J, a first end of the document pressing portion is pivotably hinged to the casing so that a second end (opposite the first end) of the document pressing portion opens and closes relative to the document reading face, and the fitter is disposed at a position close to a rotation axis about which the document pressing portion is pivotably hinged to the casing.

According to this aspect, as described in the first modification, as compared with a case where the fitter is disposed at a position far from the rotation axis, interference occurs when an elevation amount between the image reading face and the document pressing portion is large on the opposite side to the rotation axis side. In general, since the user perform operations at the front on the side opposite to the rotation axis side, it is easy for the user to perceive the interference (abnormality) at a stage earlier than the action of closing the document pressing portion.

(Aspect L)

In the above aspects J or K, the image reading device further includes an open-close detector such as the push switch 47 to detect opening and closing of the document pressing portion.

According to this aspect, as described in the first modification, the open state and the closed state of the document pressing portion is reliably detected.

(Aspect M)

In the above aspect L, the image reading device further includes a notifying device, such as the control panel 200, to issue an alarm based on a detection result of the open-close detector.

According to this aspect, as described in the first modification, when the user closes the document pressing portion and reads the document, an error message such as "Have you released the carriage lock?" can be notified in a case where the restraint is located at the first unlock position such that the user is urged to move the restraint to the second unlock position.

(Aspect N)

In any one of the above aspects J to M, the fitter includes a fitting protruding portion such as the fitting convex portion 241 of the lock fitting member 24 on one of the operation portion of the restraint and the document pressing portion, and two fitting recesses such as the lock position concave portion 426*a* and the unlock securing position concave portion 426*b* on the other one of the operation portion of the restraint and the document pressing portion, the two fitting recesses being fit with the fitting protruding portion at the restricting position and the second unlock position of the restraint when the document pressing portion is closed.

According to this aspect, as described in the first modification, the fitter can be configured with a simple configuration.

(Aspect O)

In the above aspect N, the image reading device further includes the inclined portion 427 between the two fitting recesses to move the restraint to the second unlock position by an abutment force of the fitting protruding portion when the document pressing portion is closed while the restraint is located at the first unlock position.

According to this aspect, as described in the second modification, when the fitting protruding portion abuts against the inclined portion 427 and then the document pressing portion is further closed, the restraint is slid, and the fitting protruding portion is fit with the fitting recess such as the unlock securing position concave portion 426*b*, to move the restraint to the second unlock position. With the inclined portion 427 of the restraint configured as described above, the restraint can be automatically moved from the first unlock position to the second unlock position in conjunction with the action of closing the document pressing portion.

(Aspect P)

In any of the above aspects J to O, the first unlock position is an arbitrary position between the restricting position and the second unlock position, to which the restraint is movable.

According to this aspect, as described in the second modification, the first unlock position can take an arbitrary position as long as the arbitrary position is a position to which the restraint is movable between the restricting position and the second unlock position.

(Aspect Q)

An image reading device such as the scanner 4 includes: an image reader such as the optical scanning unit 40 movable along an image reading face such as the document table 41, a restraint such as the lock member 42 to restrict movement of the image reader; a casing such as the casing 4*a* in which the image reader is housed; and a document pressing portion such as the ADF 2 or the plain pressure plate openably and closably supported by the casing to press a document placed on the image reading face against the image reading face when the document pressing portion is closed, in which the restraint such as the lock member 42 includes the operation portion 425 disposed outside the casing, and is movably held in the casing so as to be able to take, by the operation portion 425, a restricting position such as the lock position at which movement of the image reader is restricted and a release position such as the unlock securing position at which restriction of movement of the image reader is canceled, the image reading device further including a fitter such as the fitting convex portion 241 of the lock fitting member 24, the lock position concave portion 426*a* and the unlock securing position concave portion 426*b*, to cause the document pressing portion and the operation portion 425 to fit with each other when the document pressing portion is closed while the restraint is located at the restricting position and the release position, in which, with the fitter, the document pressing portion and the operation portion 425 interfere with each other when the document pressing portion is closed while the restraint is located between the restricting position and the release position.

According to this aspect, as described in the above first or second modification, when the document pressing portion is closed while the restraint is located between the restricting position and the release position, interference occurs, and the user is urged to move the restraint to the release position.

(Aspect R)

An image forming apparatus such as the color copier 1 including the image reading device according to any one of the aspects A to Q.

According to this aspect, as described in the above embodiment, it becomes easier to switch between the restricting position at which the movement of the image reader is restricted and the release position in response to the operation by the user and, when it is desired to avoid the image reader from moving to and being secured at the restricting position, the image reader is restrained from unnecessarily secured due to erroneous operation by the user.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. An image reading device comprising:
   an image reader movable along an image reading face;
   a casing configured to house the image reader, the casing including a restraint holder; and
   a restraint to be held by the restraint holder of the casing and configured to restrict movement of the image reader, the restraint including an operation portion to be disposed outside the casing,
   the operation portion to be operated to move the restraint, in the restraint holder, to:
     a restricting position to restrict movement of the image reader;
     a first unlock position to cancel restriction of movement of the image reader, the first unlock position from which movement to the restricting position is allowed; and
     a second unlock position at which movement of the image reader is not restricted, the second unlock position from which movement to the restricting position is less smooth than the movement from the first unlock position to the restricting position.

2. The image reading device according to claim 1,
   wherein the restraint holder of the casing includes a holding portion configured to hold the restraint,
   wherein the image reader includes a restraint receiver, and
   wherein the restraint includes:
     an engaging portion configured to engage the restraint receiver of the image reader; and a securing portion to be held by the holding portion of the casing, to secure the restraint at the second unlock position.

3. The image reading device according to claim 2, wherein the casing includes a slot through which the restraint is movable while the engaging portion and the securing portion of the restraint are inserted in the slot, and wherein the image reading device further includes a retainer configured to prevent the restraint from loosening off from the slot.

4. The image reading device according to claim 3, wherein the retainer includes:
   a snap-fit portion provided in one of the restraint and the casing; and
   a receiving portion provided in the other one of the restraint and the casing, the receiving portion in which the snap-fit portion fits.

5. The image reading device according to claim 3, wherein the retainer includes:
   a protruding portion provided in one of the restraint and the casing, and
   a recess provided in the other one of the restraint and the casing, the recess in which the protruding portion slidably fits.

6. The image reading device according to claim 1, further comprising a positioning portion configured to set the restraint at each of the restricting position, the first unlock position, and the second unlock position with respect to the casing.

7. The image reading device according to claim 6, wherein the positioning portion includes:
   at least one protruding portion provided in one of the casing and the restraint; and
   at least one recess provided in the other one of the casing and the restraint, the at least one recess in which the at least one protruding portion is removably inserted.

8. The image reading device according to claim 7, wherein at least one of the at least one protruding portion and the at least one recess is disposed at each of a plurality of positions along a movement direction of the restraint.

9. The image reading device according to claim 8, wherein at least one of the at least one protruding portion and the at least one recess is configured to make force for inserting and removing the at least one protruding portion into and from the at least one recess smaller at the restricting position and at the first unlock position than at the second unlock position.

10. The image reading device according to claim 1, further comprising a document pressing portion openably and closably supported by the casing, the document pressing portion configured to press a document placed on the image reading face against the image reading face when the document pressing portion is closed relative to the image reading face; and
    a fitter configured to cause the document pressing portion to fit with the operation portion when the document pressing portion is closed while the restraint is at one of the restricting position and the second unlock position,
    the fitter configured to cause the document pressing portion to interfere with the operation portion when the document pressing portion is closed while the restraint is at the first unlock position.

11. The image reading device according to claim 10, wherein the document pressing portion includes:
    a first end pivotably hinged to the casing; and
    a second end opposite the first end, the second end to open and close relative to the image reading face, and
    wherein the fitter is disposed close to a rotation axis about which the document pressing portion pivots.

12. The image reading device according to claim 10, further comprising a detector configured to detect opening and closing of the document pressing portion.

13. The image reading device according to claim 12, further comprising a notifying device configured to issue an alarm based on a detection result of the detector.

14. The image reading device according to claim 10, wherein the fitter includes:
    a fitting protruding portion provided in one of the operation portion of the restraint and the document pressing portion; and
    two fitting recesses provided in the other one of the operation portion of the restraint and the document pressing portion, the two fitting recesses being fit with the fitting protruding portion at the restricting position and the second unlock position of the restraint when the document pressing portion is closed.

15. The image reading device according to claim 14, further comprising an inclined portion between the two fitting recesses, the inclined portion configured to move, upon contact with the fitting protruding portion, the restraint to the second unlock position when the document pressing portion is closed while the restraint is at the first unlock position.

16. The image reading device according to claim 15, wherein the first unlock position is between the restricting position and the second unlock position.

17. An image forming apparatus comprising the image reading device according to claim 1.

18. An image reading device comprising:
    an image reader movable along an image reading face;
    a casing configured to house the image reader, the casing including a restraint holder;
    a document pressing portion openably and closably supported by the casing, the document pressing portion to press a document placed on the image reading face against the image reading face when the document pressing portion is closed relative to the image reading face;
    a restraint to be held by the restraint holder of the casing and configured to restrict movement of the image reader, the restraint including an operation portion to be disposed outside the casing,
    the operation portion to be operated to move the restraint, in the restraint holder, to:
       a restricting position to restrict movement of the image reader; and
       an unlock position to cancel restriction of movement of the image reader; and
    a fitter configured to cause the document pressing portion to fit with the operation portion when the document pressing portion is closed while the restraint is at one of the restricting position and the unlock position,
    the fitter configured to cause the document pressing portion to interfere with the operation portion when the document pressing portion is closed while the restraint is between the restricting position and the unlock position.

19. An image forming apparatus comprising the image reading device according to claim 18.

\* \* \* \* \*